(12) United States Patent
Botts et al.

(10) Patent No.: US 11,920,309 B2
(45) Date of Patent: Mar. 5, 2024

(54) SUBSURFACE ENERGY STORAGE SYSTEM WITH INTEGRATED ENERGY STORAGE UNITS AND RELATED METHODS

(71) Applicants: Jerold L. Botts, Orlando, FL (US); James Lounsbery, Middletown, NY (US)

(72) Inventors: Jerold L. Botts, Orlando, FL (US); James Lounsbery, Middletown, NY (US)

(*) Notice: Subject to any disclaimer, the term of this patent is extended or adjusted under 35 U.S.C. 154(b) by 0 days.

(21) Appl. No.: 18/334,447

(22) Filed: Jun. 14, 2023

(65) Prior Publication Data
US 2023/0323610 A1  Oct. 12, 2023

Related U.S. Application Data

(63) Continuation-in-part of application No. PCT/US2023/064085, filed on Mar. 10, 2023.
(Continued)

(51) Int. Cl.
*E01C 11/26* (2006.01)
*E01C 9/00* (2006.01)
(Continued)

(52) U.S. Cl.
CPC .............. *E01C 11/265* (2013.01); *E01C 9/00* (2013.01); *E01C 11/227* (2013.01); *E01C 23/00* (2013.01);
(Continued)

(58) Field of Classification Search
CPC ........ E01C 9/00; E01C 11/227; E01C 11/265; E01C 23/00; H01M 10/425; H01M 50/21;
(Continued)

(56) References Cited

U.S. PATENT DOCUMENTS 3,795,180 A * 3/1974 Larsen .................... E01C 13/02
  405/36
3,908,385 A * 9/1975 Daniel .................. E01C 13/083
  405/38
(Continued)

FOREIGN PATENT DOCUMENTS

CN   110424207       11/2019
DE   WO 2022043328  * 3/2022  ............ H02S 40/30

OTHER PUBLICATIONS

Gabriel Haines "Basic Operation of a Battery Energy Storage System (BESS)" https://www.adelaide.edu.au/energy-storage/docs/aeskb-case-study-1-basic-operation-of-a-bess.PDF Mar. 27, 2018: pp. 14.

*Primary Examiner* — Raymond W Addie
(74) *Attorney, Agent, or Firm* — Allen, Dyer, Doppelt + Gilchrist, PA

(57) ABSTRACT

A subsurface energy storage system includes roadway housings arranged to define a surface to carry vehicles. Each roadway housing has an energy storage assembly having a housing defining cavities, and energy storage units respectively carried within the cavities and being electrically coupled together. Each roadway housing also includes a layer adjacent to the energy storage assembly and to provide the surface to carry vehicles. The subsurface energy storage system also includes an energy storage management controller coupled to the energy storage units in the roadway housings.

20 Claims, 21 Drawing Sheets

Related U.S. Application Data

(60) Provisional application No. 63/269,187, filed on Mar. 11, 2022.

(51) Int. Cl.
| | |
|---|---|
| *E01C 11/22* | (2006.01) |
| *E01C 23/00* | (2006.01) |
| *E01F 9/50* | (2016.01) |
| *H01M 10/42* | (2006.01) |
| *H01M 50/251* | (2021.01) |
| *H02N 2/18* | (2006.01) |
| *H02S 10/20* | (2014.01) |
| *H02S 20/21* | (2014.01) |

(52) U.S. Cl.
CPC ............ *E01F 9/50* (2016.02); *H01M 10/425* (2013.01); *H01M 50/251* (2021.01); *H02N 2/186* (2013.01); *H02S 10/20* (2014.12); *H02S 20/21* (2014.12); *H01M 2010/4271* (2013.01); *H01M 2220/10* (2013.01)

(58) Field of Classification Search
CPC ...... H01M 2010/4271; H01M 2220/10; H02N 2/186; H02S 10/20; H02S 20/21; E01F 9/50
USPC .................................. 404/12–16, 17–31, 72
See application file for complete search history.

(56) References Cited

U.S. PATENT DOCUMENTS

| | | |
|---|---|---|
| 9,959,754 B1 | 5/2018 | King |
| 10,045,490 B2* | 8/2018 | Gooden ................... E01C 5/001 |
| 11,746,477 B2* | 9/2023 | Arvati ..................... E01C 5/226 |
| | | 404/44 |
| 2008/0286043 A1 | 11/2008 | Seo |
| 2009/0188172 A1* | 7/2009 | DuCharme ......... E04D 13/0477 |
| | | 52/11 |
| 2010/0327602 A1 | 12/2010 | Jordan |
| 2012/0045314 A1 | 2/2012 | Mauro et al. |
| 2013/0328387 A1 | 12/2013 | Venkateswaran et al. |
| 2017/0252256 A1* | 9/2017 | Henshue ................... E01C 5/20 |
| 2018/0102730 A1 | 4/2018 | Brusaw et al. |
| 2019/0368141 A1 | 2/2019 | Griffin et al. |

\* cited by examiner

SUBSURFACE ENERGY STORAGE SYSTEM WITH INTEGRATED ENERGY STORAGE UNITS AND RELATED METHODS

RELATED APPLICATION

This application is a continuation-in-part of International Patent Application No. PCT/US2023/064085 filed Mar. 10, 2023, which claims priority to Application No. 63/269,187 filed Mar. 11, 2022, the entire subject matter of which is incorporated herein by reference in its entirety.

TECHNICAL FIELD

The present disclosure relates to the field of roadway construction, and, more particularly, to a roadway energy storage system and related methods.

BACKGROUND

The world has limited natural resources. Indeed, many of these natural resources, such as hydrocarbon fuels, cannot be replenished and take years, decades or centuries to replenish. To this extent, the world has become vastly dependent on hydrocarbon fuels that are being depleted at an alarming rate and at a certain point in time will be completely gone. As the supply of hydrocarbon fuels continues to be depleted, the demand has continued to increase. This condition will eventually lead to the cost of acquiring these hydrocarbon fuels to be prohibitive. Moreover, the use of hydrocarbon fuels generates greenhouse gases, which have a negative environmental effect.

SUMMARY

Generally, a subsurface energy storage system comprises a plurality of roadway housings arranged to define a surface to carry vehicles. Each roadway housing comprises an energy storage assembly comprising a housing defining a plurality of cavities therein, and a plurality of energy storage units respectively carried within the plurality of cavities and being electrically coupled together. Each roadway housing also includes at least one layer adjacent to the energy storage assembly and to provide the surface to carry vehicles. The subsurface energy storage system also includes an energy storage management controller coupled to the plurality of energy storage units in the plurality of roadway housings.

In particular, the housing may define a plurality of channels at a periphery thereof. Each roadway housing may further comprise a drainage channel under the energy storage assembly, and a support assembly under the drainage channel. The support assembly may comprise a support layer abutting the drainage channel, and a plurality of vertical legs extending from the support layer.

In some embodiments, the at least one layer may comprise a transducer layer configured to generate energy from traffic on the surface to carry vehicles, and being coupled to the energy storage management controller. Each roadway housing may further comprise a distribution conduit coupled to the energy storage assembly.

Also, the housing may define at least one longitudinal cavity, and the energy storage assembly may comprise at least one charging device within the at least one longitudinal cavity. The at least one layer may comprise an over layer defining the surface to carry vehicles and comprising at least one visual indicator carried by the over layer for the surface to carry vehicles, or a heating element layer for deicing the surface to carry vehicles. For example, each of the plurality of energy storage units comprises one of a battery and a capacitor.

Another aspect is directed to a roadway housing device for a subsurface energy storage system arranged to define a surface to carry vehicles. The roadway housing device comprises an energy storage assembly comprising a housing defining a plurality of cavities therein, and a plurality of energy storage units respectively carried within the plurality of cavities and being electrically coupled together. The roadway housing device further comprises at least one layer adjacent to the energy storage assembly and to provide the surface to carry vehicles, and an energy storage management controller coupled to the energy storage assembly.

Yet another aspect is directed to a method for making a subsurface energy storage system. The method comprises positioning a plurality of roadway housings to define a surface to carry vehicles. Each roadway housing comprises an energy storage assembly comprising a housing defining a plurality of cavities therein, and a plurality of energy storage units respectively carried within the plurality of cavities and being electrically coupled together. Each roadway housing comprises at least one layer adjacent to the energy storage assembly and to provide the surface to carry vehicles. The method also includes coupling an energy storage management controller to the plurality of energy storage units in the plurality of roadway housings.

DETAILED DESCRIPTION

Figure 1:
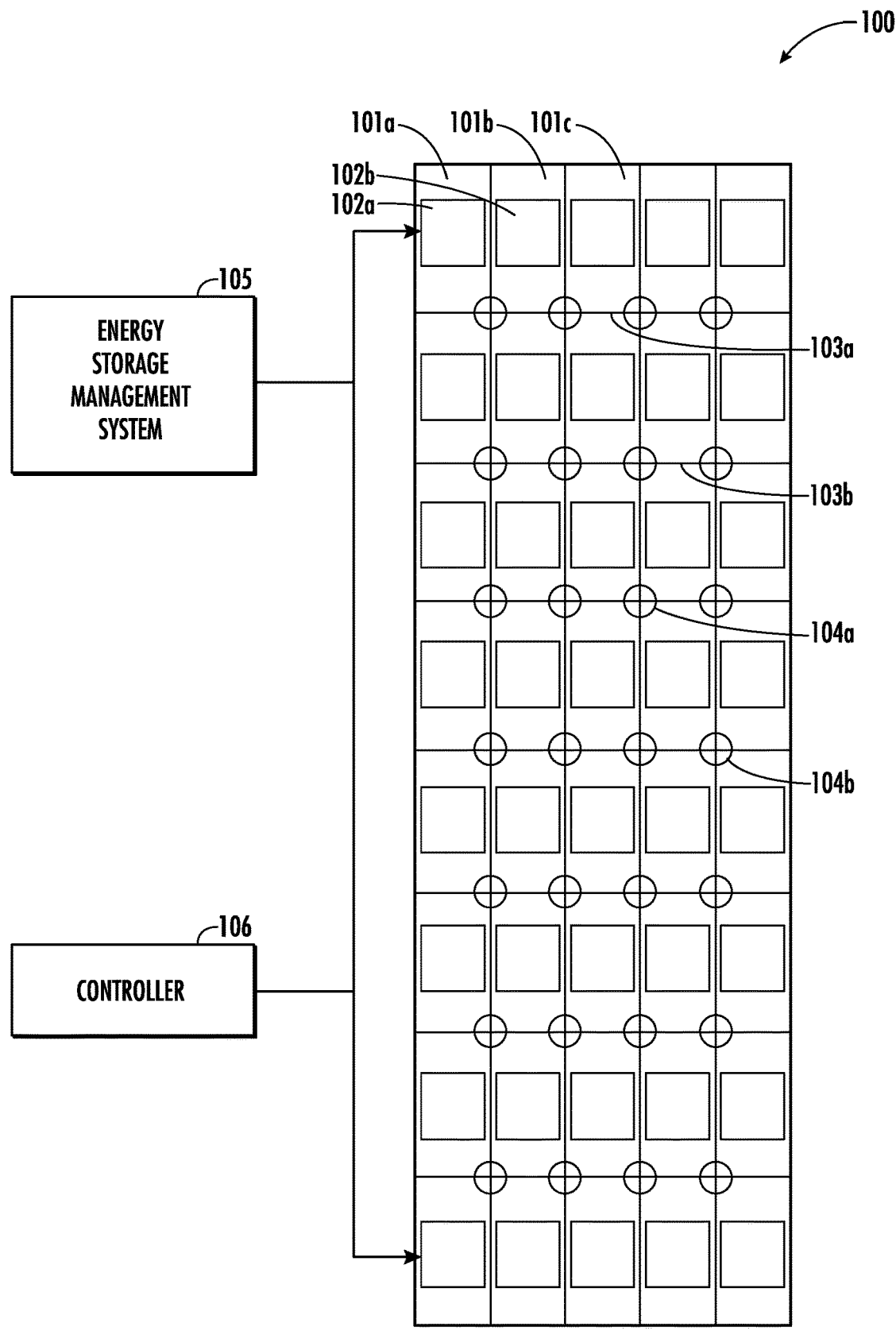
FIG. 1 is a schematic diagram of a first embodiment of a roadway energy storage system, according to the present disclosure.

Renewable energies may include hydropower, wind power, solar power, thermal power, and tidal power, for example. These power generation sources are in close proximity to their natural resource. Much of this energy that is created is fed into the grid during low demand periods, and the energy produced may go unused and/or wasted—lost due to a lack of storage capability. One of the current needs in the renewable energy production field is more energy storage approaches.

Beyond the replacement of hydrocarbon fuels with renewable energy, the deployment of electric vehicles (EVs) versus those powered by hydrocarbon fuels has been helpful. These vehicles are the future of public transportation, but there are many obstacles that have limited their general acceptance by society to date, i.e. charging stations are limited and so called "Range Anxiety".

With the advent of sensor technology, there are a multitude of roadway enhancements for wirelessly charging EVs, and for alerting drivers of upcoming obstructions on the roadways, such as accidents or stopped traffic flow. There are several approaches for solar power integrated roadways to help create electricity on road surfaces. These are great concepts and ideas, but without a nationwide "Storage Grid", the solar power generating roadways can only distribute their collected energy to the local electrical grid. And any roadway sensors or wireless charging solutions for roadways are grid dependent to stay operating.

The disclosed roadway energy storage systems (RESS) is an approach to be an available location for grid energy to be stored when demand is low and fed back when demand increases. The same concept applies to renewable sources. There will not be energy wasted with accessible storage under the road surfaces. That is, all energy will have a place to be stored until needed. Just like roadways of today have high occupancy vehicle (HOV) lanes, the days are here where there can be EV charging lanes. EVs can charge nonstop while in transit to their destinations without the need to stop once on long haul trips.

With more energy storage options available, renewable energy would be more widely accepted as a beneficial source of energy production. The need is great, and the amount of road surfaces nationwide and worldwide provide unlimited opportunities for Energy Storage Locations.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIG. 1, a roadway energy storage system 100 according to the present invention is now described. As will be appreciated, the roadway energy storage system 100 functions as a roadway for vehicles to travel upon. The roadway energy storage system 100 includes a plurality of roadway housings 101a-101n illustratively arranged in a five by eight grid. Each roadway housing 101a-101n comprises a modular structure that defines a cavity therein. As will be appreciated, the modular nature of the plurality of roadway housings 101a-101n permits customization of the installed arrangement to fit the roadway. Moreover, if portions of the roadway energy storage system 100 need repair, damaged modular roadway housings 101a-101n can be readily replaced.

The modular structure includes sidewalls, and a removable top cover comprising a lower surface to face the cavity and an upper surface to define a roadway surface to carry the vehicles. The modular structure may include, for example, a resilient mechanically strong material, such as a polymer plastic (e.g. HDPE), resin material, ceramic material, fabric material. The modular structure may comply with Department of Transportation regulations on roadway surfaces. For example, the upper surface may have a threshold anti-skid feature.

The roadway energy storage system 100 comprises a plurality of energy storage units 102a-102n respectively carried within cavities of the plurality of roadway housings 101a-101n and being electrically coupled together. Each of the plurality of energy storage units 102a-102n may comprise at least one of a lithium ion battery cell device, an assembly of individual lithium ion battery cells, a nickel cadmium battery cell device, or a capacitive based energy storage device, for example. In some embodiments, the cavity is sized to receive one or more standard sized battery cells (i.e. commercial off the shelf cells). Helpfully, commercial off the shelf battery cells can be used in the roadway energy storage system 100.

In particular, the roadway energy storage system 100 illustratively comprises a plurality of channels 103a-103n extending between the plurality of roadway housings 101a-101n. Each of the plurality of channels 103a-103n may comprise a same resilient mechanically strong material of the modular structure. In some embodiments, each of the plurality of channels 103a-103n is permanently sealed, and in other embodiments, each of the plurality of channels 103a-103n includes a removable top for access during maintenance operations.

The roadway energy storage system 100 comprises a plurality of electrically conductive connections coupled between the plurality of energy storage units 102a-102n and being respectively carried by the plurality of channels 103a-103n. For example, each of the plurality of electrically conductive connections may comprise an electrically conductive wire. In some embodiments, the roadway energy storage system 100 includes electrical connections for coupling to a power grid infrastructure.

The roadway energy storage system 100 comprises a plurality of drainage features 104a-104b between the plurality of roadway housings 101a-101n. In some embodiments, the plurality of drainage features 104a-104b is also respectively carried within the plurality of channels 103a-103n. In other embodiments, the plurality of drainage features 104a-104b is separate from the plurality of channels 103a-103n. As will be appreciated, the plurality of drainage features 104a-104b is configured to direct storm water and ice melt off the roadway surface and to existing storm water utilities. In some embodiments, the plurality of channels 103a-103n is configured to carry additional utility features, such as sewer/drainage, water, telecommunications, gas, etc.

The roadway energy storage system 100 further includes an energy storage management system (e.g. the illustrated battery management system (BMS) 105) coupled to the plurality of energy storage units. The energy storage management system 105 is configured to monitor a plurality of battery health characteristics of the plurality of energy storage units 102a-102n. The energy storage management system 105 is configured to provide active/passive load balancing for the plurality of energy storage units 102a-102n based upon complete current control.

In some embodiments, the roadway energy storage system 100 comprises a plurality of heating elements carried respectively with the plurality of roadway housings 101a-101n. The plurality of heating elements is configured to heat the roadway surface to prevent icing. The plurality of heating elements may be powered via the plurality of energy storage units 102a-102n.

In some embodiments, the roadway energy storage system 100 comprises a power conversion circuit configured to convert direct current (DC) power from the plurality of energy storage units 102a-102n to alternating current (AC) power. For example, the AC power may be transmitted to the power grid infrastructure.

The roadway energy storage system 100 comprises a controller 106 coupled to the energy storage management system 105. The controller 106 may comprise an integrated circuit device and is configured to provide energy management system functions, supervisory control, and data acquisition system functions, and charge balancing functions.

In some embodiments, the roadway energy storage system 100 comprises a wireless charging feature carried by the upper surface of the plurality of roadway housings 101a-101n. The wireless charging feature is configured to charge electrical vehicles while traveling on the roadway energy storage system 100. In some embodiments, the roadway energy storage system 100 comprises a plugin charging station adjacent to the roadway surface. The plugin charging station is electrically powered by combination of the power infrastructure grid and the plurality of energy storage units 102a-102n.

Figure 2:
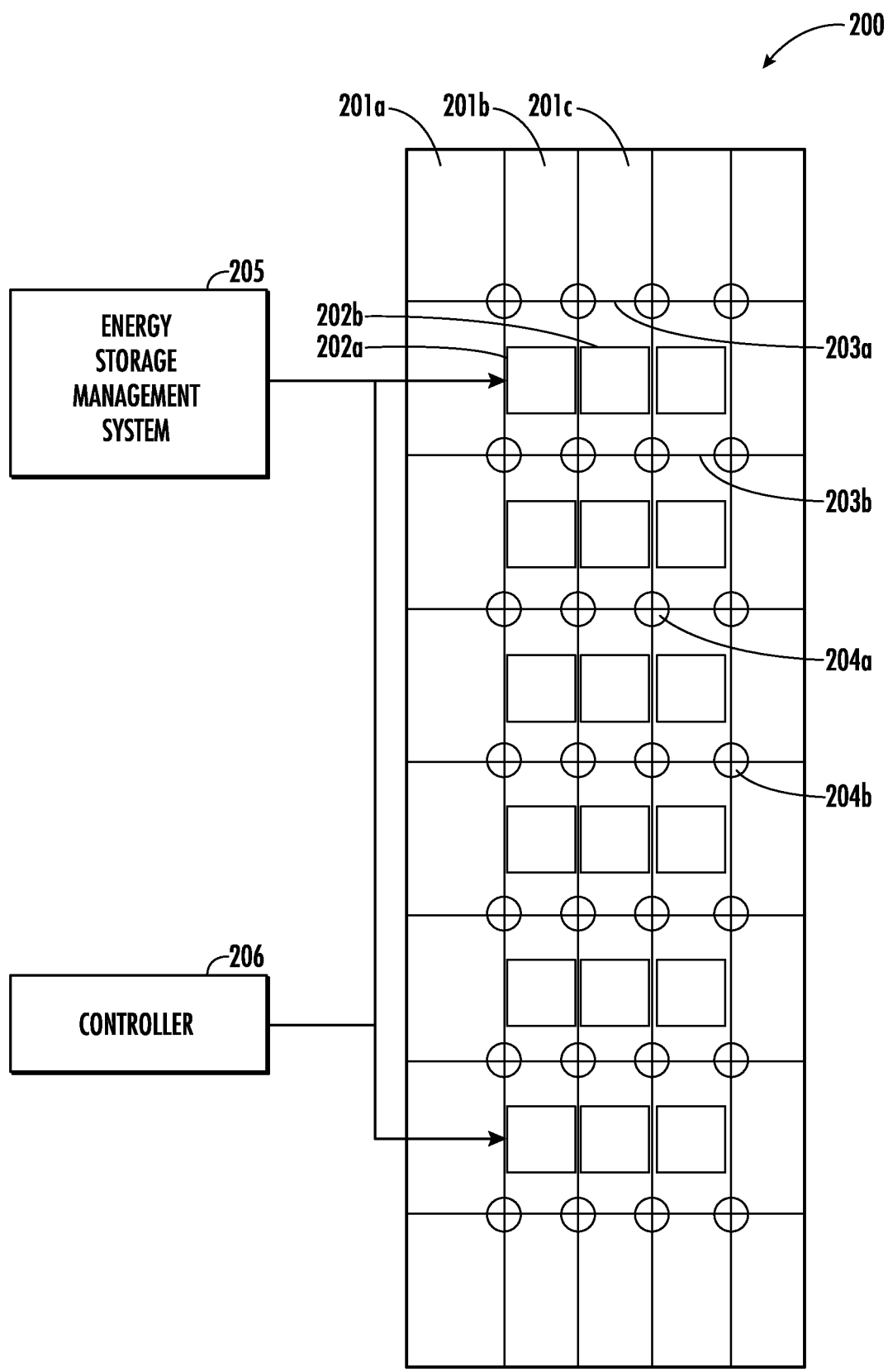
FIG. 2 is a schematic diagram of a second embodiment of a roadway energy storage system, according to the present disclosure.

Referring now additionally to FIG. 2, another embodiment of the roadway energy storage system 200 is now described. In this embodiment of the roadway energy storage system 200, those elements already discussed above with respect to FIG. 1 are incremented by 100 and most require no further discussion herein. This embodiment differs from the previous embodiment in that this roadway energy storage system 200 illustratively includes a different grid structure. In particular, the outer rows of the grid structure do not include energy storage units within the respective cavities of the plurality of roadway housings 201a-201n. In this embodiment, the empty cavities can be used to carry circuitry for the energy storage management system 205 and controller 206. In some applications, structure for storm water and other utilities can be stored within the empty cavities.

Figure 3:
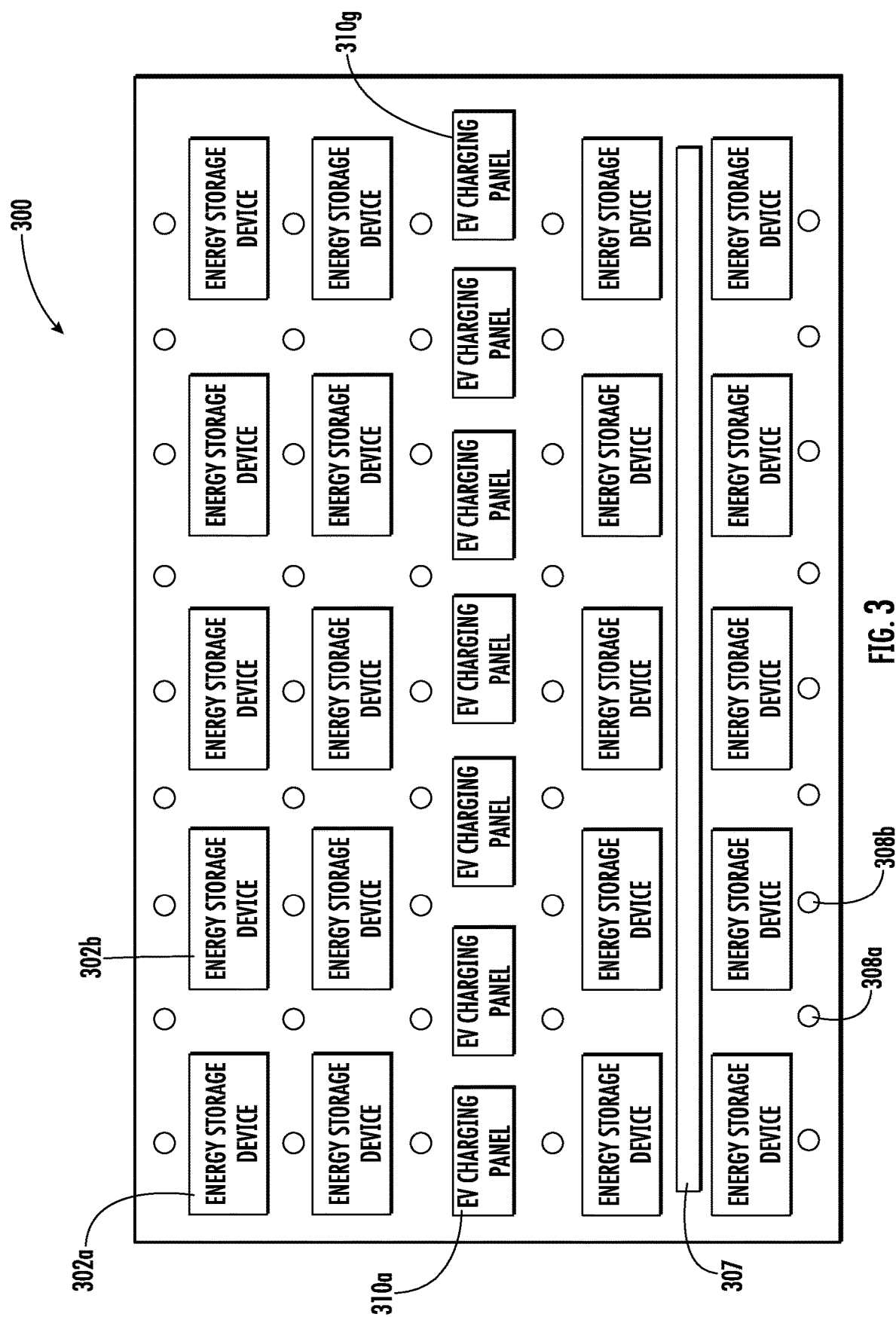
FIG. 3 is a schematic diagram of a third embodiment of a roadway energy storage system, according to the present disclosure.

Referring now additionally to FIG. 3, another embodiment of the roadway energy storage system 300 is now described. In this embodiment of the roadway energy storage system 300, those elements already discussed above with respect to FIG. 1 are incremented by 200 and most require no further discussion herein. This embodiment differs from the previous embodiment in that this roadway energy storage system 300 illustratively includes an EV charging rail 307. The EV charging rail 307 is placed to align with a desired vehicle traffic lane for charging EVs traveling on the roadway energy storage system 300 (i.e. providing an EV charging lane for the roadway). The roadway energy storage system 300 illustratively comprises a plurality of solar power generation cells 310a-310g adjacent to the plurality of energy storage units 302a-302n. For example, the plurality of solar power generation cells 310a-310g comprises photovoltaic cells. The plurality of solar power generation cells 310a-310g is configured to generate a DC power signal to charge the plurality of energy storage units 302a-302n. The roadway energy storage system 300 illustratively includes a plurality of drainage ports 308a-308b interspersed throughout.

Figure 4:
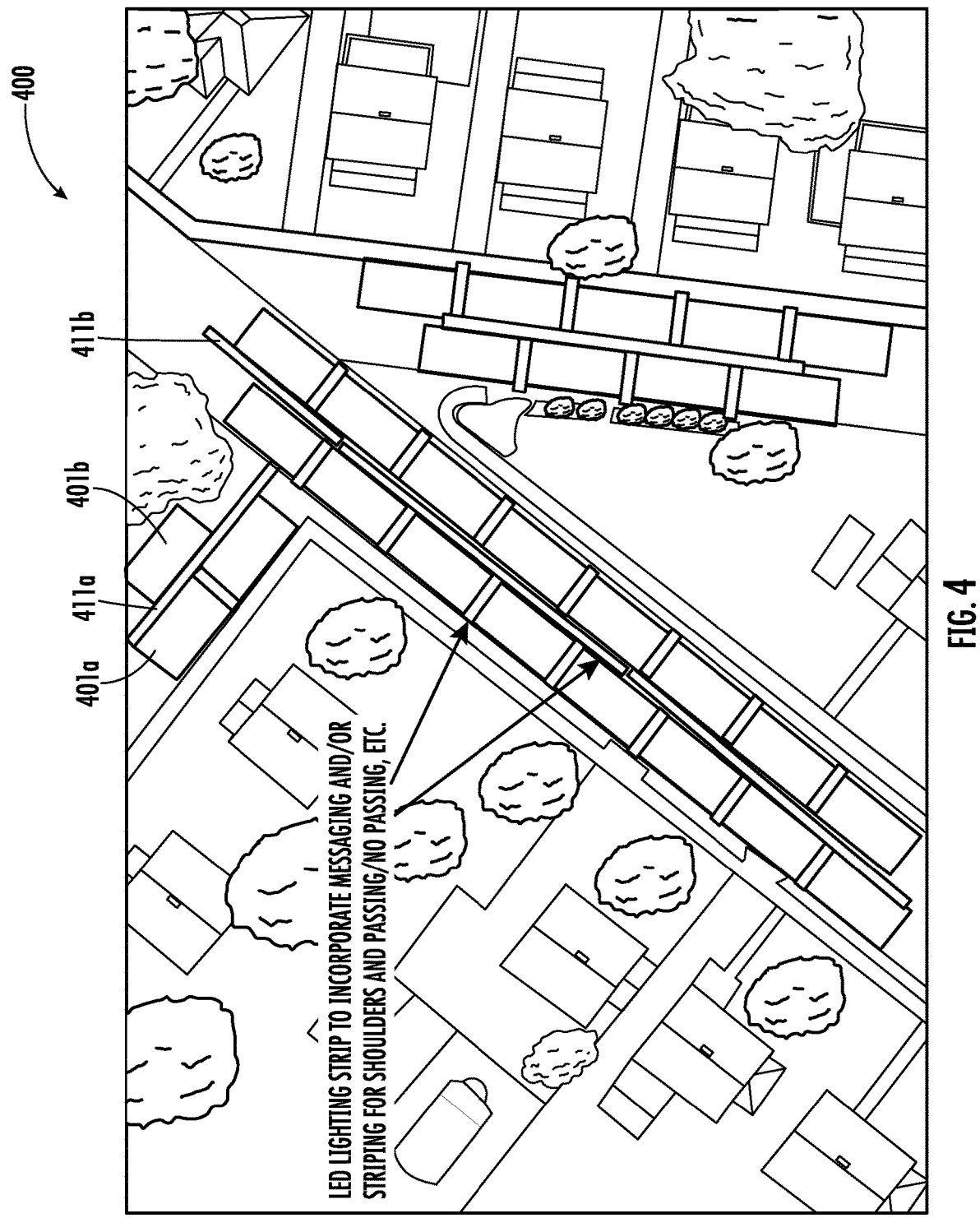
FIG. 4 is a schematic diagram of a fourth embodiment of a roadway energy storage system, according to the present disclosure.

Referring now additionally to FIG. 4, another embodiment of the roadway energy storage system 400 is now described. In this embodiment of the roadway energy storage system 400, those elements already discussed above with respect to FIG. 1 are incremented by 300 and most require no further discussion herein. This embodiment differs from the previous embodiment in that this roadway energy storage system 400 illustratively includes a plurality of visual indictor devices 411a-411n (e.g. illustrated light emitting diodes (LED) indicators) between the plurality of roadway housings 401a-401n. The plurality of visual indictor devices 411a-411n is configured to generate visual indicators (i.e. navigation of roadway signalization indications) to operators of the vehicles travelling on the roadway energy storage system 400.

Figure 5:
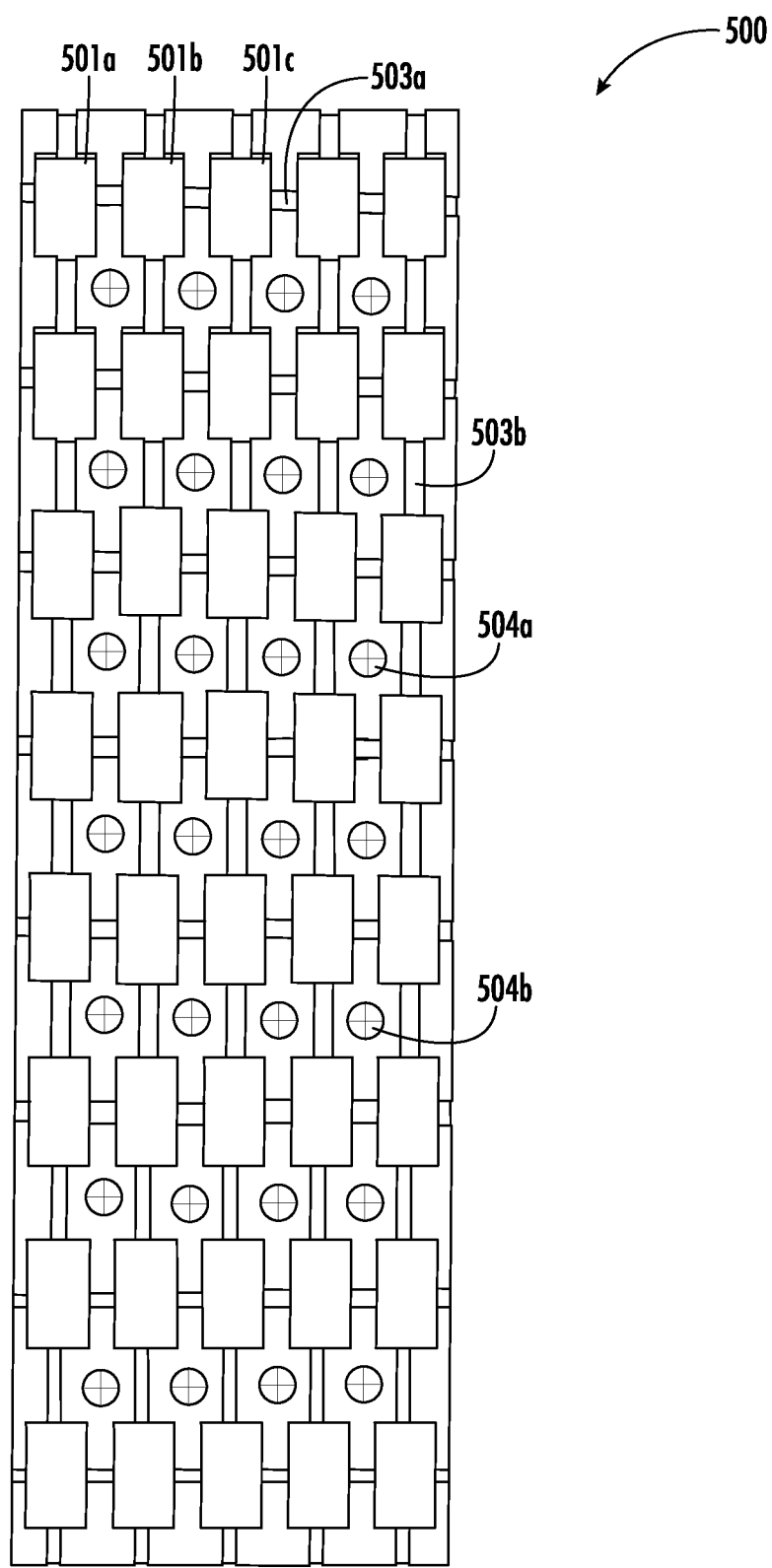
FIG. 5 is a schematic diagram of a fifth embodiment of a roadway energy storage system, according to the present disclosure.

Referring now additionally to FIG. 5, another embodiment of the roadway energy storage system 500 is now described. In this embodiment of the roadway energy storage system 500, those elements already discussed above with respect to FIG. 1 are incremented by 400 and most require no further discussion herein. This embodiment differs from the previous embodiment in that this roadway energy storage system 500 illustratively includes a plurality of channels 503a-503n in a grid format between each and every roadway housing 501a-501n.

Figure 6:
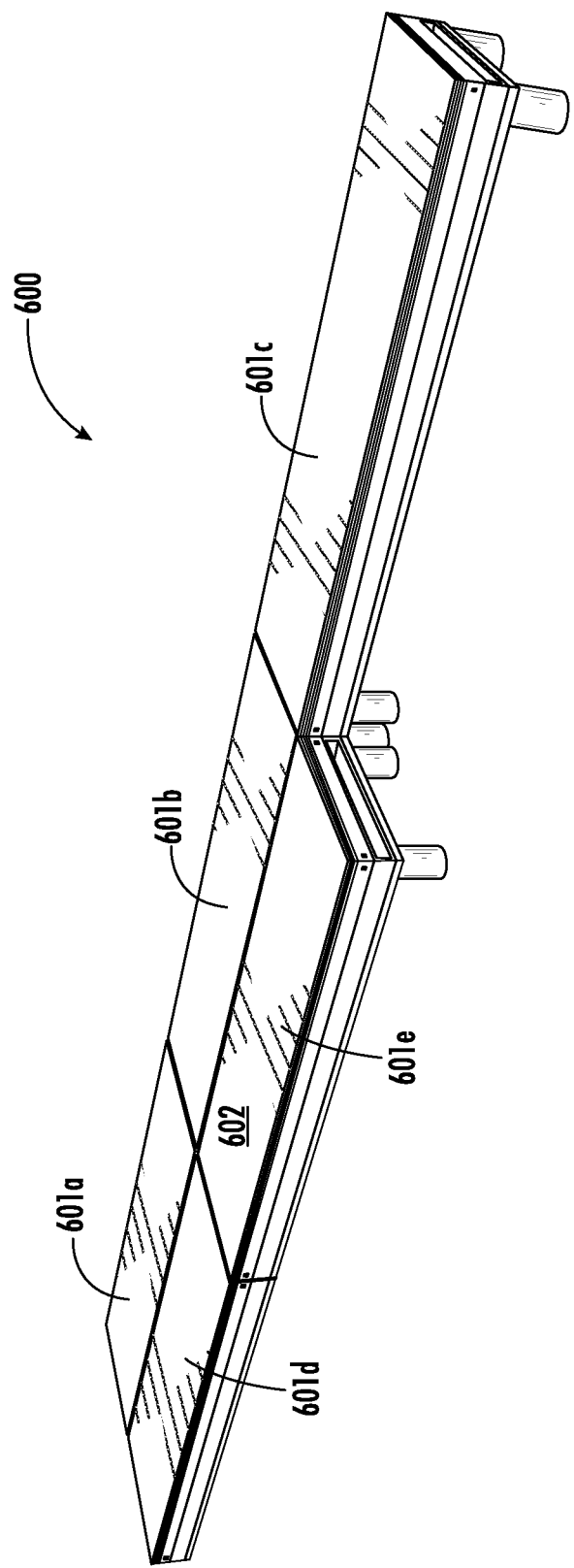
FIG. 6 is a perspective view of a subsurface energy storage system, according to the present disclosure.
Figure 7:
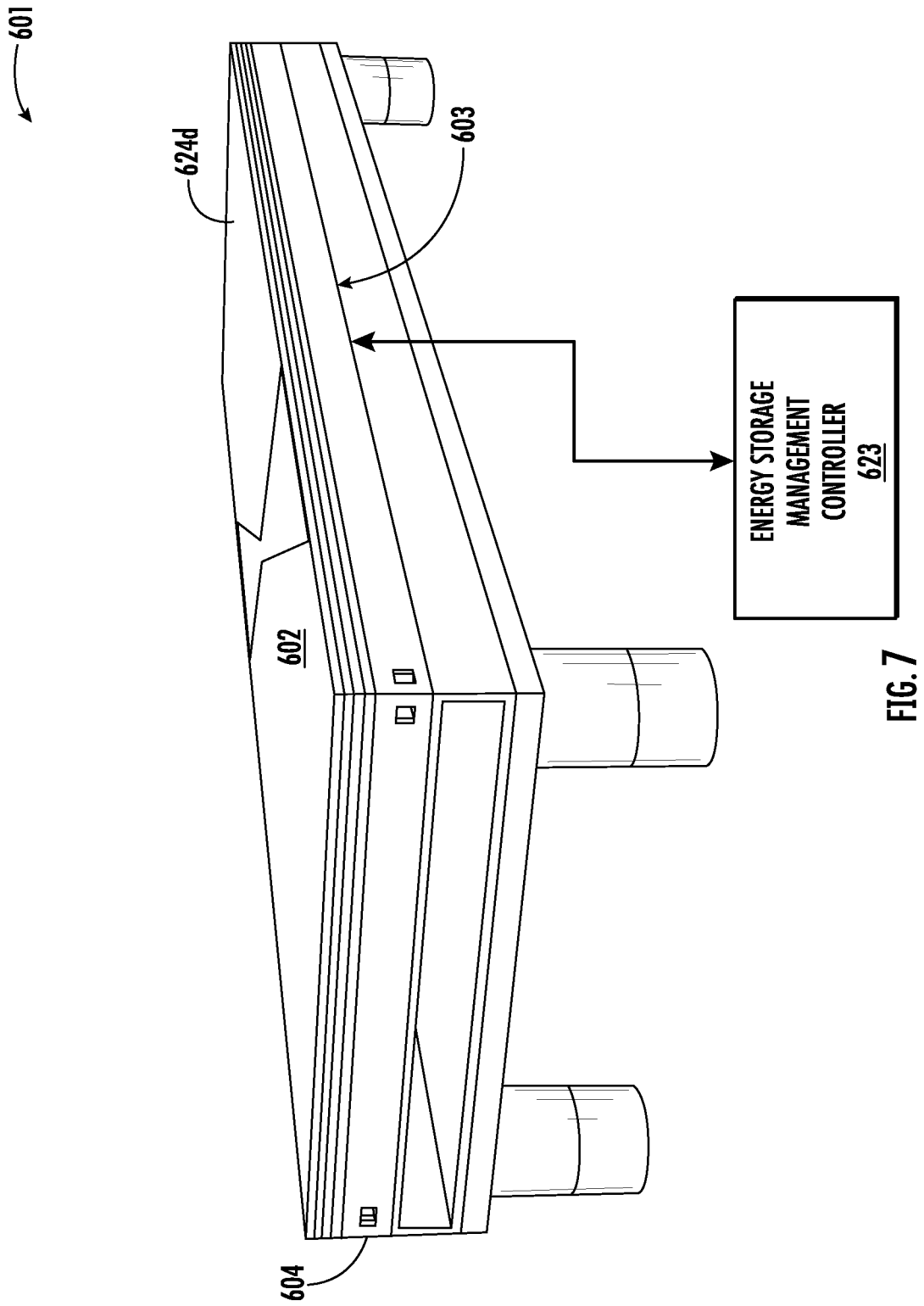
FIG. 7 is a perspective view of a roadway housing from the subsurface energy storage system of FIG. 6.
Figure 8:
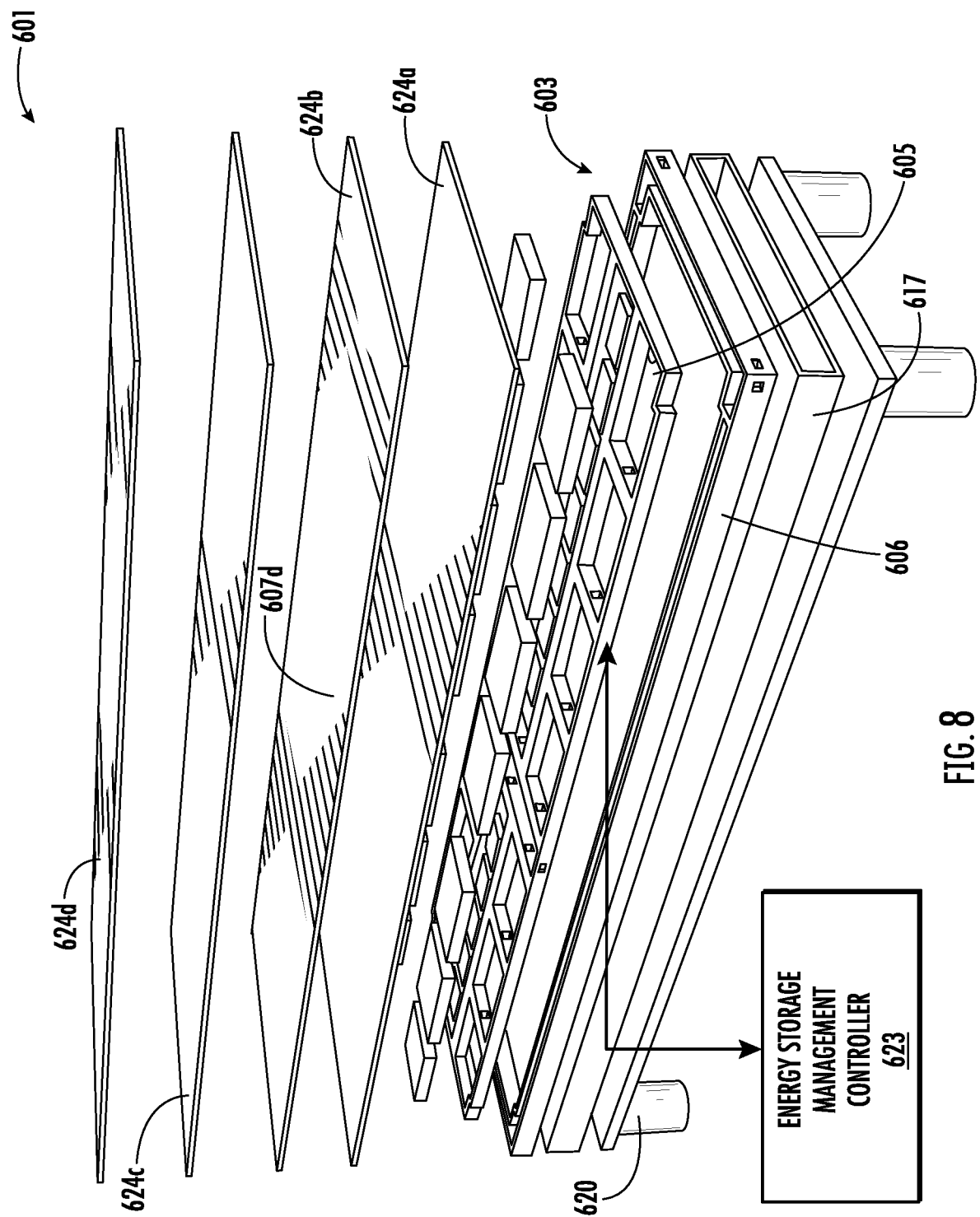
FIG. 8 is an exploded view of the roadway housing from the subsurface energy storage system of FIG. 6.

Referring now to FIGS. 6-8, a subsurface energy storage system 600 comprises a plurality of roadway housings 601a-601n arranged to define a surface 602 to carry vehicles. It should be appreciated that the subsurface energy storage system 600 may be integrated into various surface applications, such as, for example, highways, driveways, embankments, shoulders, sidewalks, etc. In the illustrated example, the plurality of roadway housings 601a-601n comprises five individual units, but as will be appreciated, the number and arrangement may vary from application to application.

With reference to additional FIGS. 9-13, each roadway housing 601a-601n comprises an energy storage assembly 603 comprising a housing 604. The housing 604 may comprise a rigid material with sufficient mechanical strength for the application. In particular, the housing 604 illustratively comprises an inner housing 605, and an outer housing 606 surrounding the inner housing. The outer housing 606 illustratively defines a plurality of channels 607a-607d at a periphery thereof, and a medial recess 608 receiving the inner housing 605. The plurality of channels 607a-607d may provide for conduit for routing cables (e.g. electrical and data transmission) within the energy storage assembly 603. The inner housing 605 defines a plurality of cavities 610a-610n therein.

Figure 10:
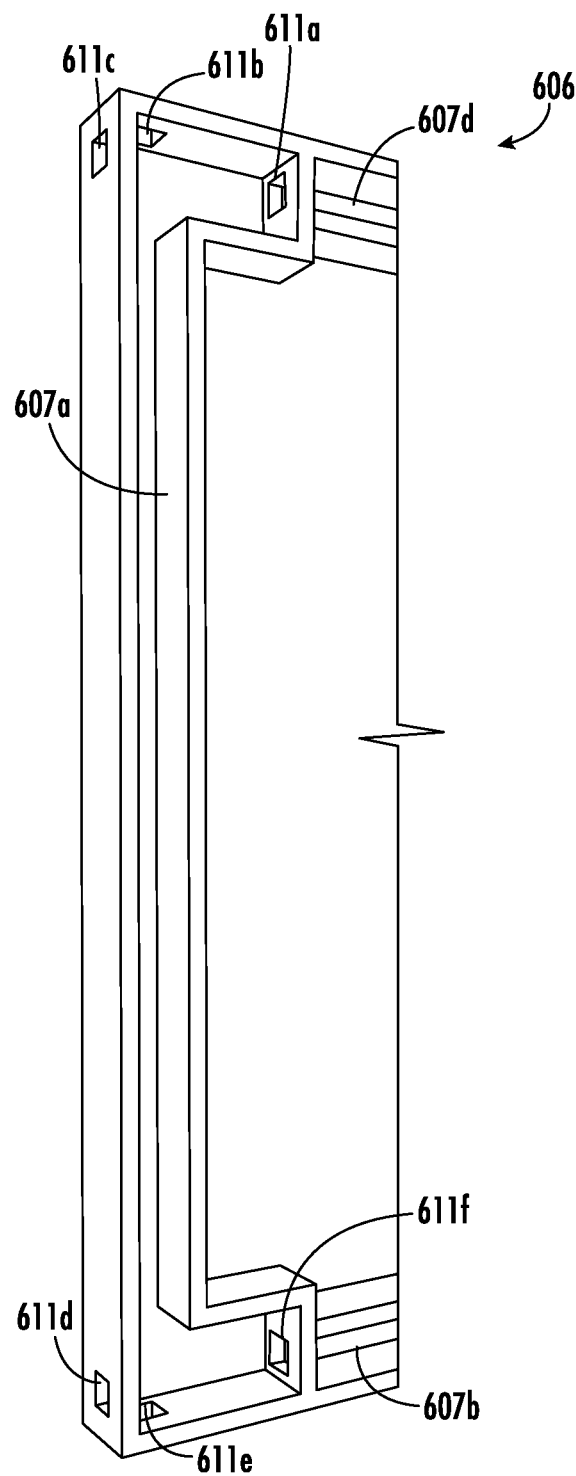
FIG. 10 is an enlarged perspective view of the outer housing from the subsurface energy storage system of FIG. 6.
Figure 11:
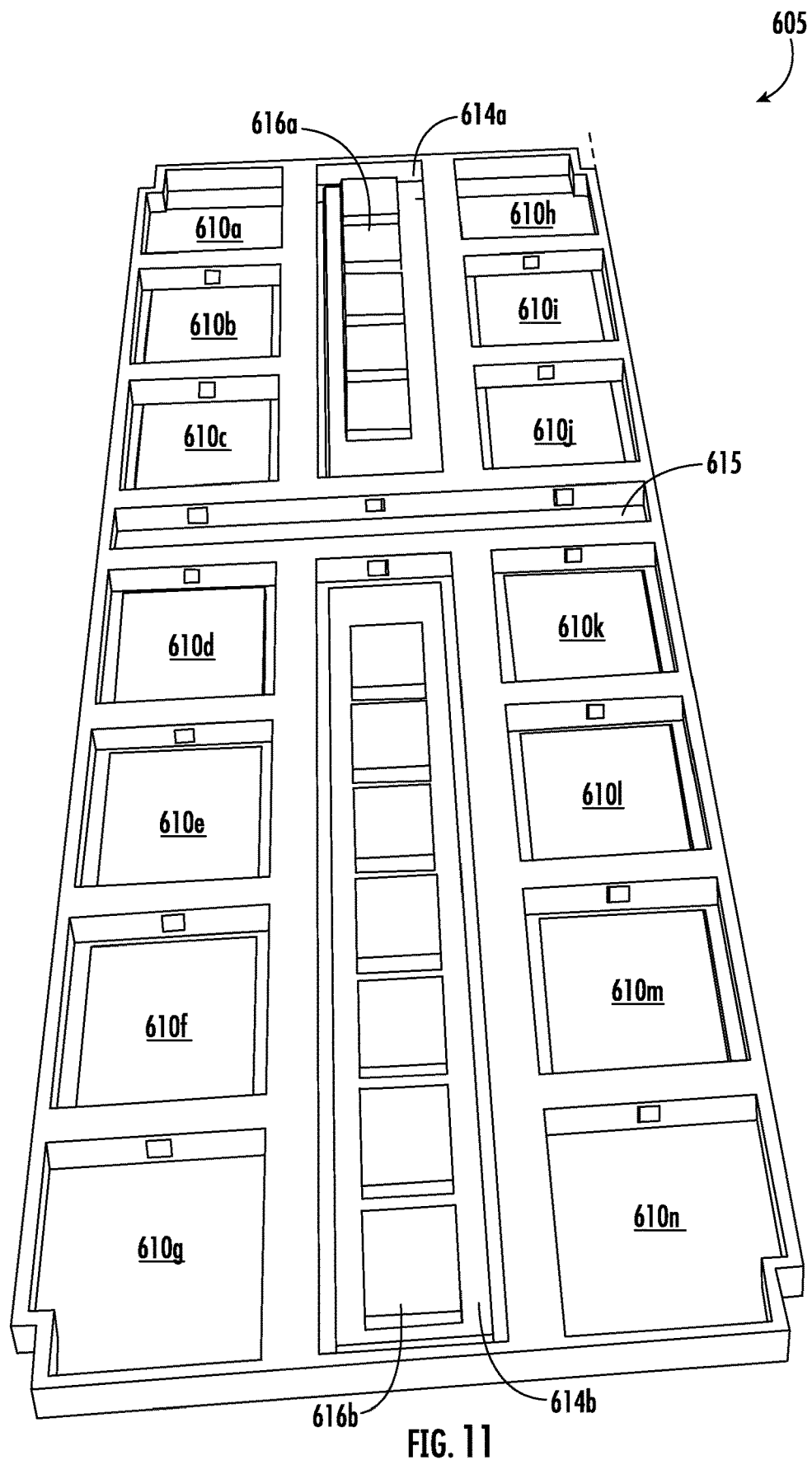
FIG. 11 is a perspective view of an inner housing from the subsurface energy storage system of FIG. 6.
Figure 12:
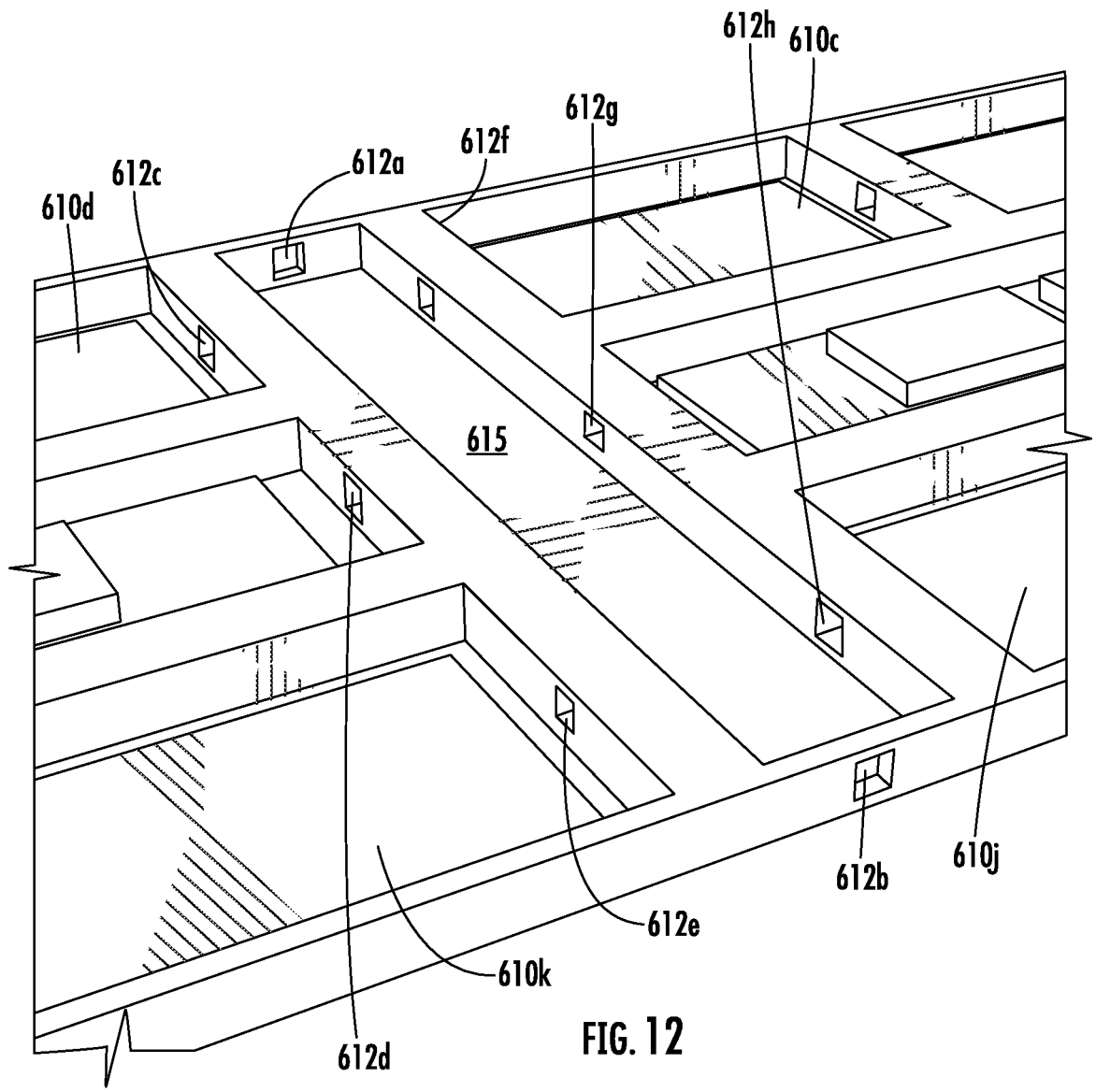
FIG. 12 is an enlarged perspective view of the inner housing from the subsurface energy storage system of FIG. 6.

As perhaps best seen in FIG. 10, the outer housing 606 illustratively defines a plurality of outer passageways 611a-611f between the plurality of channels 607a-607d and on the outer surfaces of the outer housing to provide external wiring access. As perhaps best seen in FIGS. 11-12, the inner housing 605 illustratively defines a plurality of inner passageways 612a-612h between the plurality of cavities 610a-610n and providing wiring access therebetween.

Each roadway housing 601a-601n illustratively comprises a plurality of energy storage units 613a-613n respectively carried within the plurality of cavities 610a-610n and being electrically coupled together. In some embodiments, the plurality of cavities 610a-610n is additionally coupled together digitally with a data connection, and or mechanically coupled together. For example, each of the plurality of energy storage units 613a-613n comprises one of a battery and a capacitor.

Also, the inner housing 605 illustratively defines first and second longitudinal cavities 614a-614b between the plurality of cavities 610a-610n, and a medial channel 615 between the first and second longitudinal cavities and providing additional wiring access. The energy storage assembly 603 illustratively comprises first and second charging devices 616a-616b (e.g., wireless charging antenna or physical connection rails and arms) within the first and second longitudinal cavities 614a-614b. In other embodiments, the first and second charging devices 616a-616b may comprise a single charging device.

Figure 14:
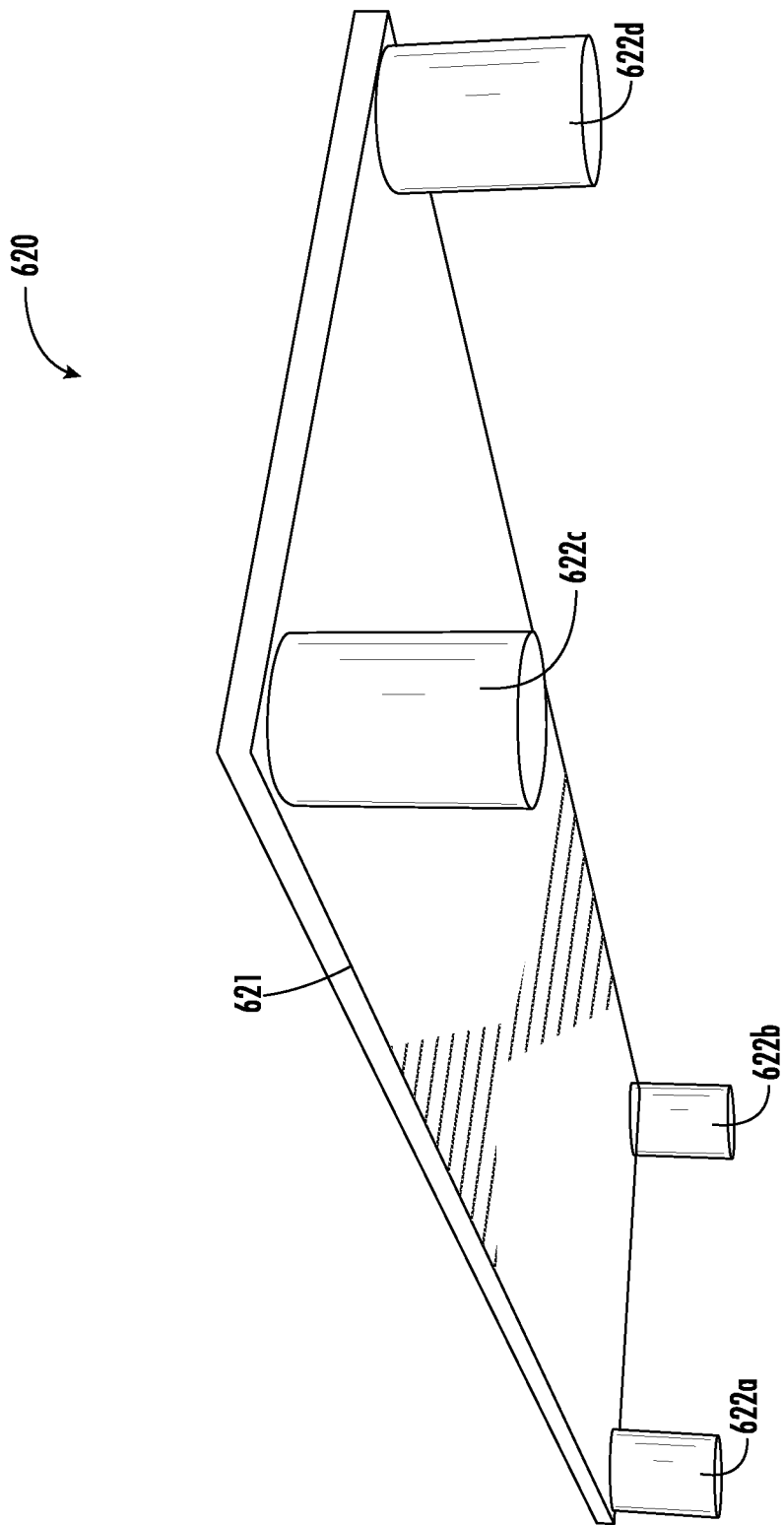
FIG. 14 is a perspective view of a support layer from the subsurface energy storage system of FIG. 6.

Referring now additionally to FIG. 14, each roadway housing 601a-601n further comprises a drainage channel 617 under the energy storage assembly 603, and a support assembly 620 under the drainage channel. The drainage channel 617 illustratively includes comprises a rectangle-shaped box with a central longitudinal passageway, and may comprise a rigid material, such as concrete or a metallic material. The support assembly 620 illustratively comprises a support layer 621 abutting the drainage channel 617, and a plurality of vertical legs 622a-622d (i.e., pilings) extending from the support layer. The support assembly 620 may comprise a rigid material, for example, concrete.

The subsurface energy storage system 600 also includes an energy storage management controller 623 coupled to the plurality of energy storage units 613a-613n in the plurality of roadway housings 601a-601n. As will be appreciated, the energy storage management controller 623 may comprise a battery management unit.

Figure 21:
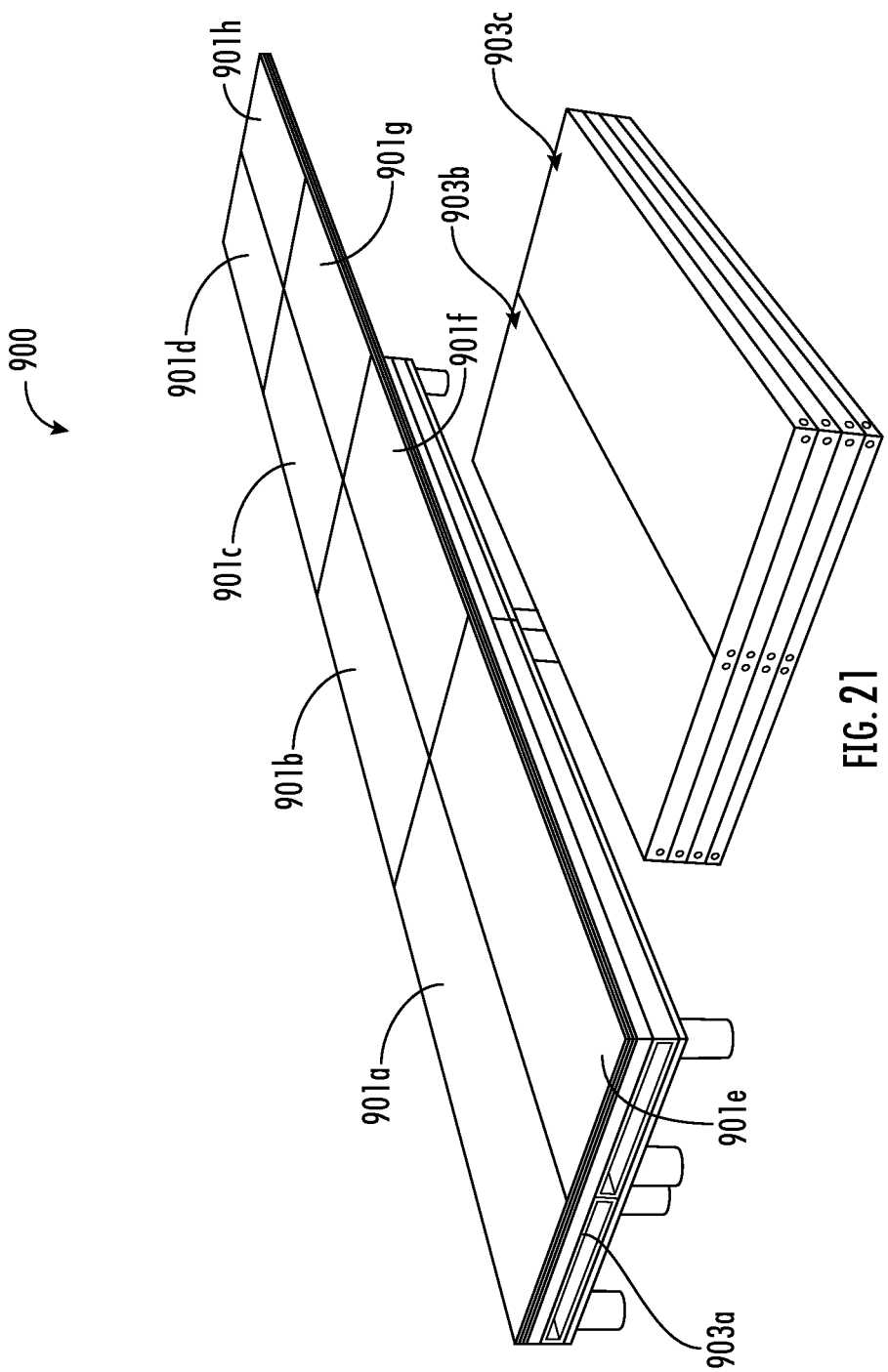
FIG. 21 is a perspective view of a sixth embodiment of a roadway energy storage system, according to the present disclosure.

As perhaps best seen in FIG. 8, each roadway housing 601a-601n illustratively comprises a plurality of layers 624a-624d over the energy storage assembly 603 and to provide the surface 602 to carry vehicles. In some embodiments, the plurality of layers 624a-624d may be adjacent the energy storage assembly 603, for example, to the side as shown in FIG. 21. In some embodiments, one or more of the plurality of layers 624a-624d may comprise a transducer layer configured to generate energy from traffic on the surface 602 to carry vehicles, and being coupled to the energy storage management controller 623.

In some embodiments, one or more of the plurality of layers 624a-624d may comprise an over layer defining the surface 602 to carry vehicles and comprising at least one visual indicator (e.g., LED traffic control lights) carried by the over layer for the surface to carry vehicles. In some embodiments, one or more of the plurality of layers 624a-624d may comprise a heating element layer for deicing the surface 602 to carry vehicles.

Yet another aspect is directed to a method for making a subsurface energy storage system 600. The method comprises positioning a plurality of roadway housings 601a-601n to define a surface 602 to carry vehicles. Each roadway housing 601a-601n comprises an energy storage assembly 603 comprising a housing 604 defining a plurality of cavities 610a-610n therein, and a plurality of energy storage units 613a-613n respectively carried within the plurality of cavities and being electrically coupled together. Each roadway housing 601a-601n comprises a plurality of layers 624a-624d over the energy storage assembly 603 and to provide the surface 602 to carry vehicles. The method also includes coupling an energy storage management controller 623 to the plurality of energy storage units 613a-613n in the plurality of roadway housings 601a-601n.

Figure 15:
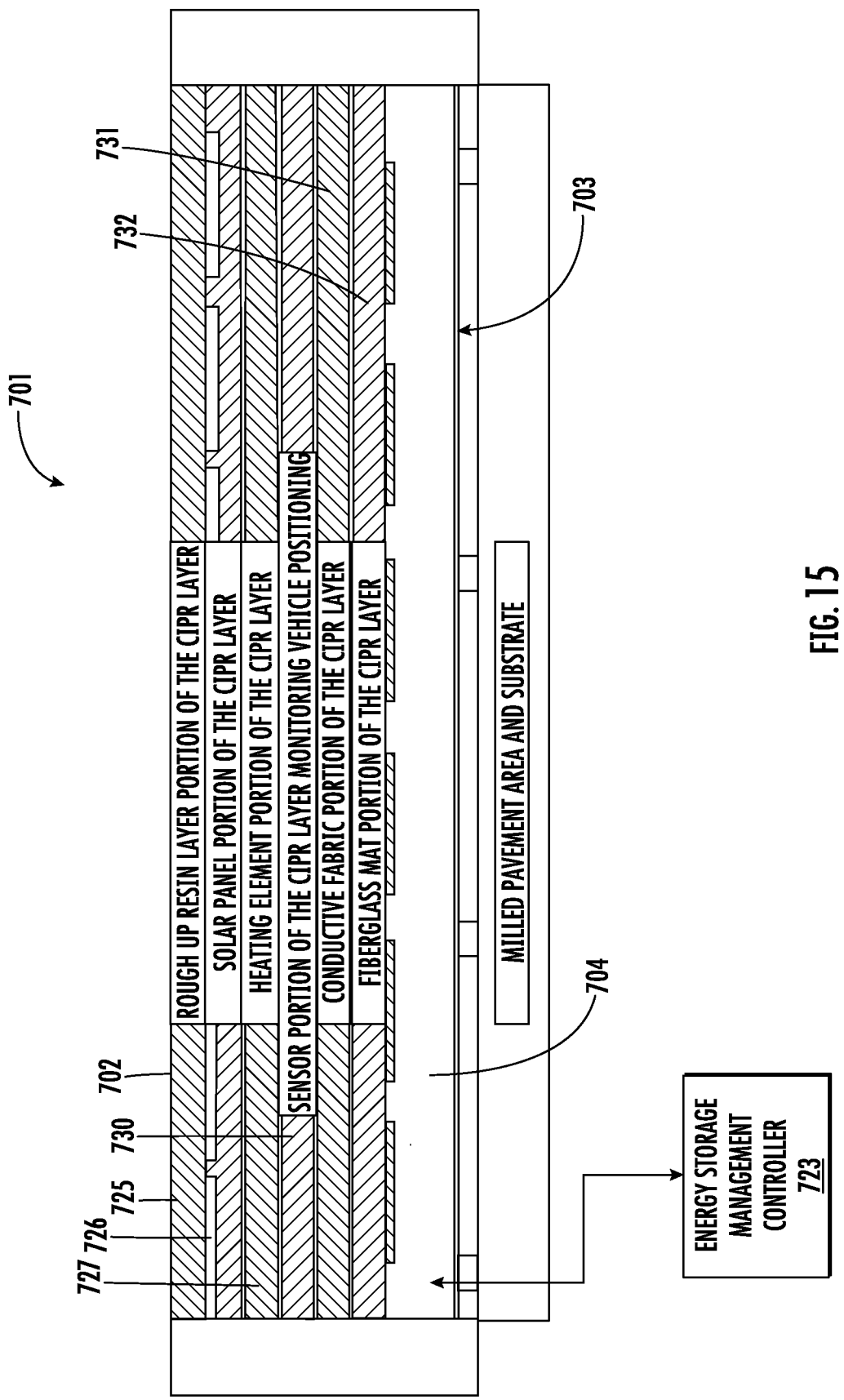
FIG. 15 is a schematic cross-section view of a second embodiment of the roadway housing from the subsurface energy storage system along line 15-15, according to the present disclosure.
Figure 16:
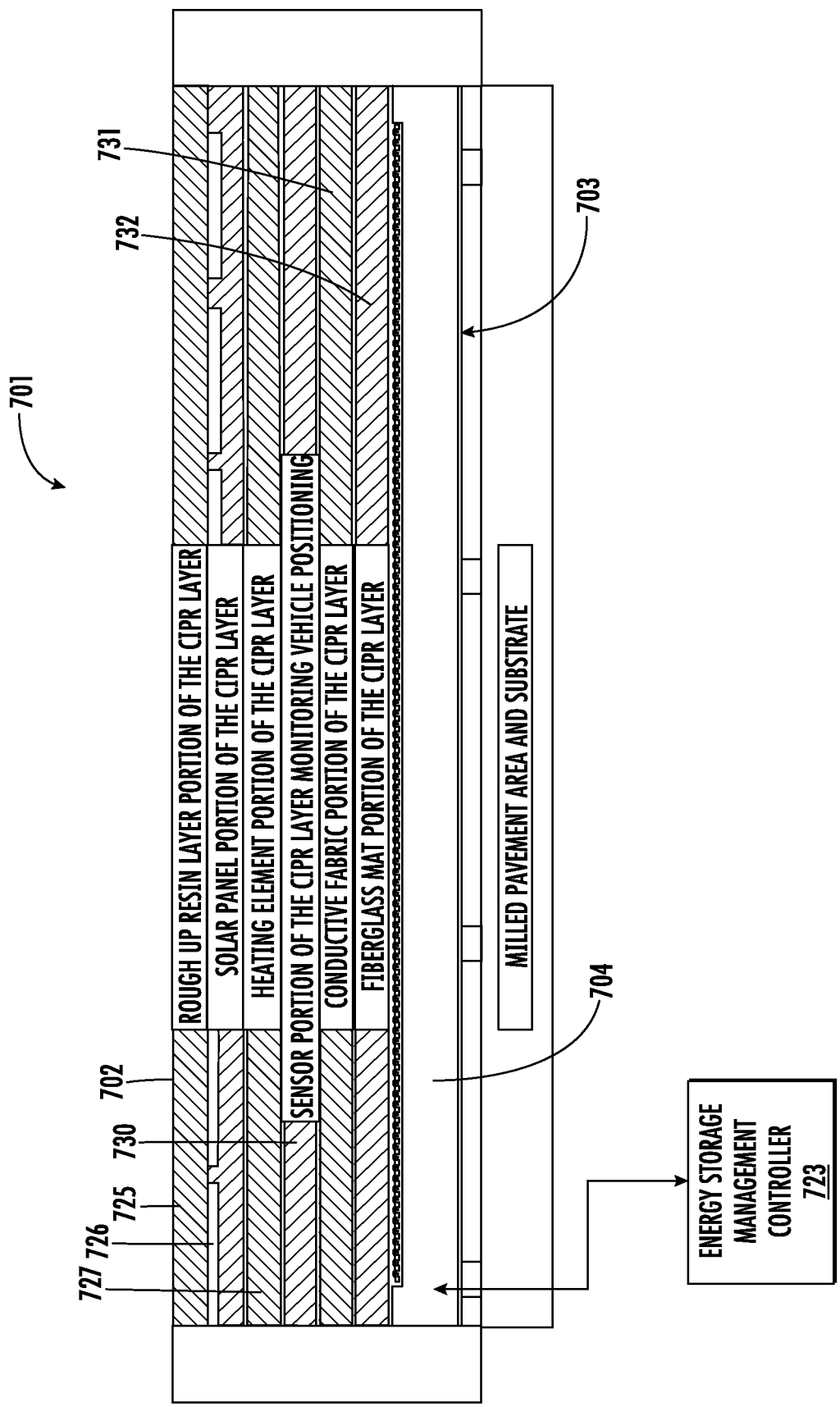
FIG. 16 is a schematic cross-section view of the second embodiment of the roadway housing from the subsurface energy storage system along line 16-16, according to the present disclosure.
Figure 17:
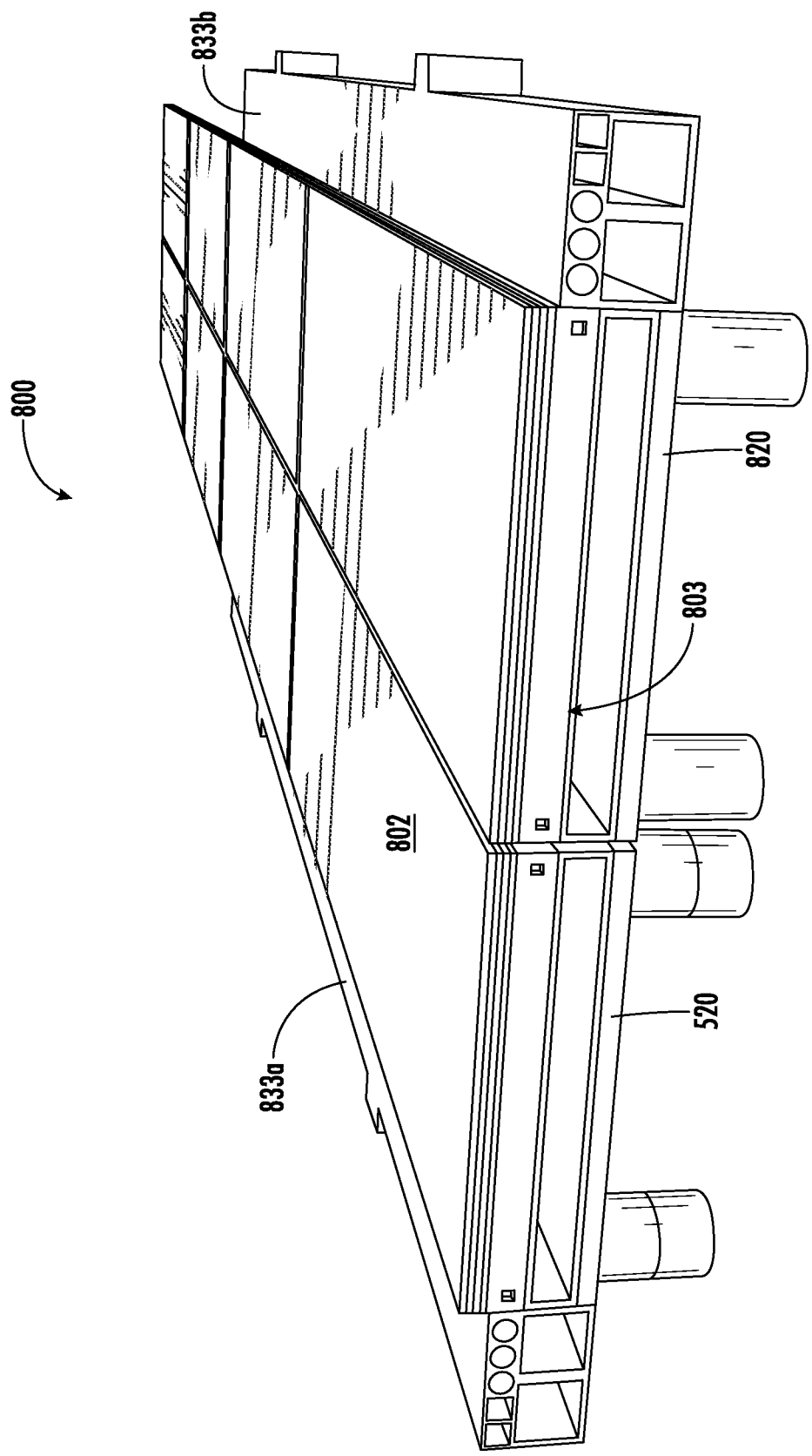
FIG. 17 is a perspective view of a third embodiment of the subsurface energy storage system, according to the present disclosure.

Referring now additionally to FIGS. 15-16, another embodiment of the roadway housing 701 is now described. In this embodiment of the roadway housing 701, those elements already discussed above with respect to FIGS. 6-14 are incremented by 100 and most require no further discussion herein. This embodiment differs from the previous embodiment in that this roadway housing 701 illustratively includes a plurality of layers over the energy storage assembly 703 and providing additional functionality. Proceeding sequentially downward, the uppermost layer of the plurality of layers comprises a hardened resin layer 725 for providing the surface 702 to carry vehicles. The next layer of the plurality of layers comprises a photovoltaic (PV) cell layer 726. The PV cell layer 726 comprises a plurality of PV cells coupled to the energy storage management controller 723. The next layer of the plurality of layers comprises a heating element layer 727. The heating element layer 727 may comprise resistive heating elements carried by a thermally conductive carrying layer. The heating element layer 727 is configured to transmit thermal radiation upward through the PV cell layer 726 and the hardened resin layer 725 to deice the surface 702 for carrying the vehicles.

The next layer of the plurality of layers comprises a sensing layer 730. The sensing layer 730 may comprise a plurality of position sensing circuits configured to monitor movement of the vehicles on the surface 702. In some embodiments, the plurality of position sensing circuits cooperate with the energy storage management controller 723 to share data with autonomous driving hardware within vehicles. The next layers of the plurality of layers comprises a conductive fabric layer 731, and a fiberglass layer 732. The fiberglass layer 732 rests on top of the housing 704.

Referring now additionally to FIGS. 17-20, another embodiment of the subsurface energy storage system 800 is now described. In this embodiment of the subsurface energy storage system 800, those elements already discussed above with respect to FIGS. 6-15 are incremented by 200 and most require no further discussion herein. This embodiment differs from the previous embodiment in that this subsurface energy storage system 800 illustratively includes the roadway housing 801 having first and second distribution conduits 833a-833b coupled to the energy storage assembly 803. The first and second distribution conduits 833a-833b are extending along the longitudinal edges of the subsurface energy storage system 800.

Figure 18:
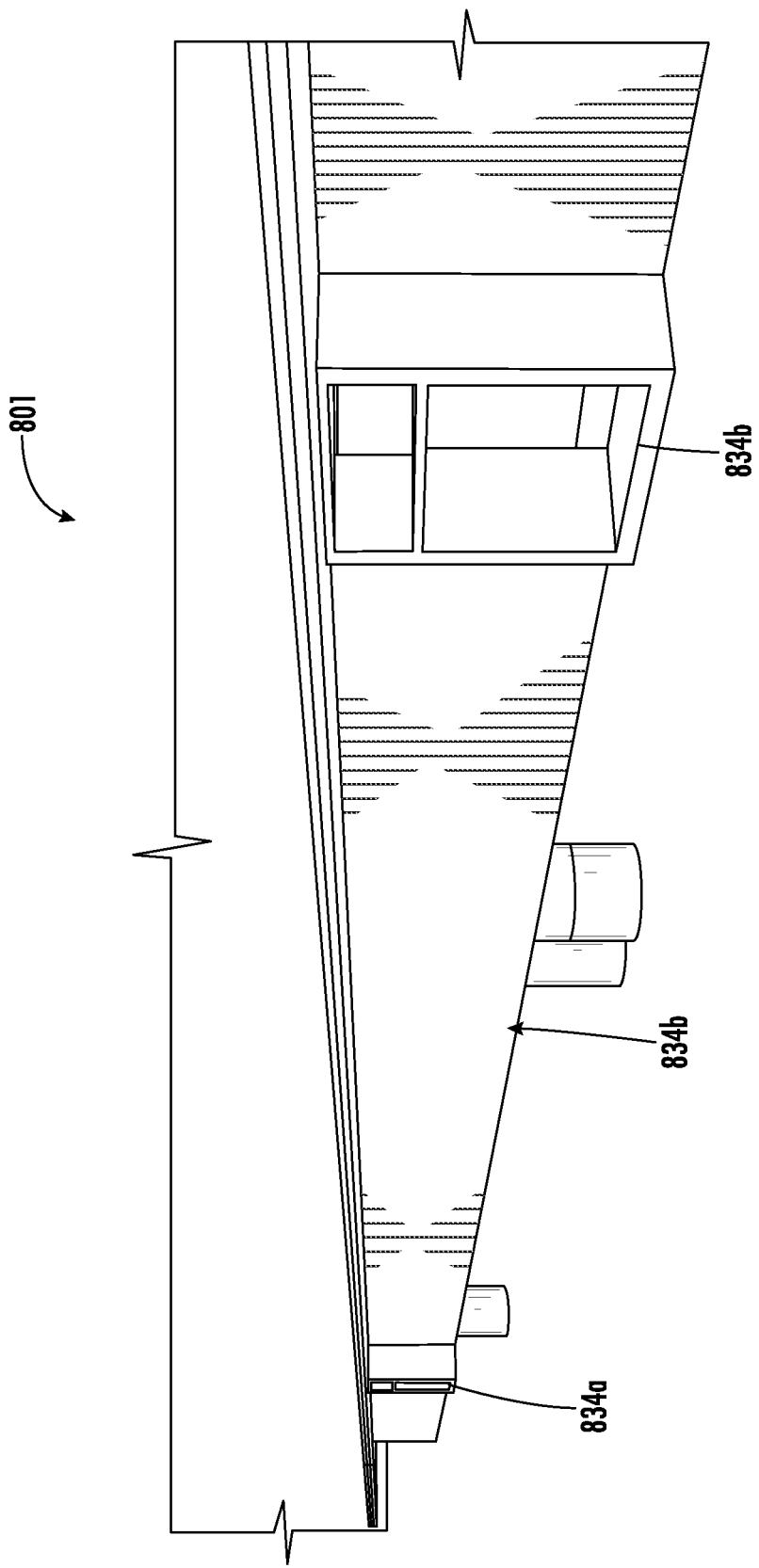
FIG. 18 is a perspective view of access ports from the subsurface energy storage system of FIG. 17.
Figure 19:
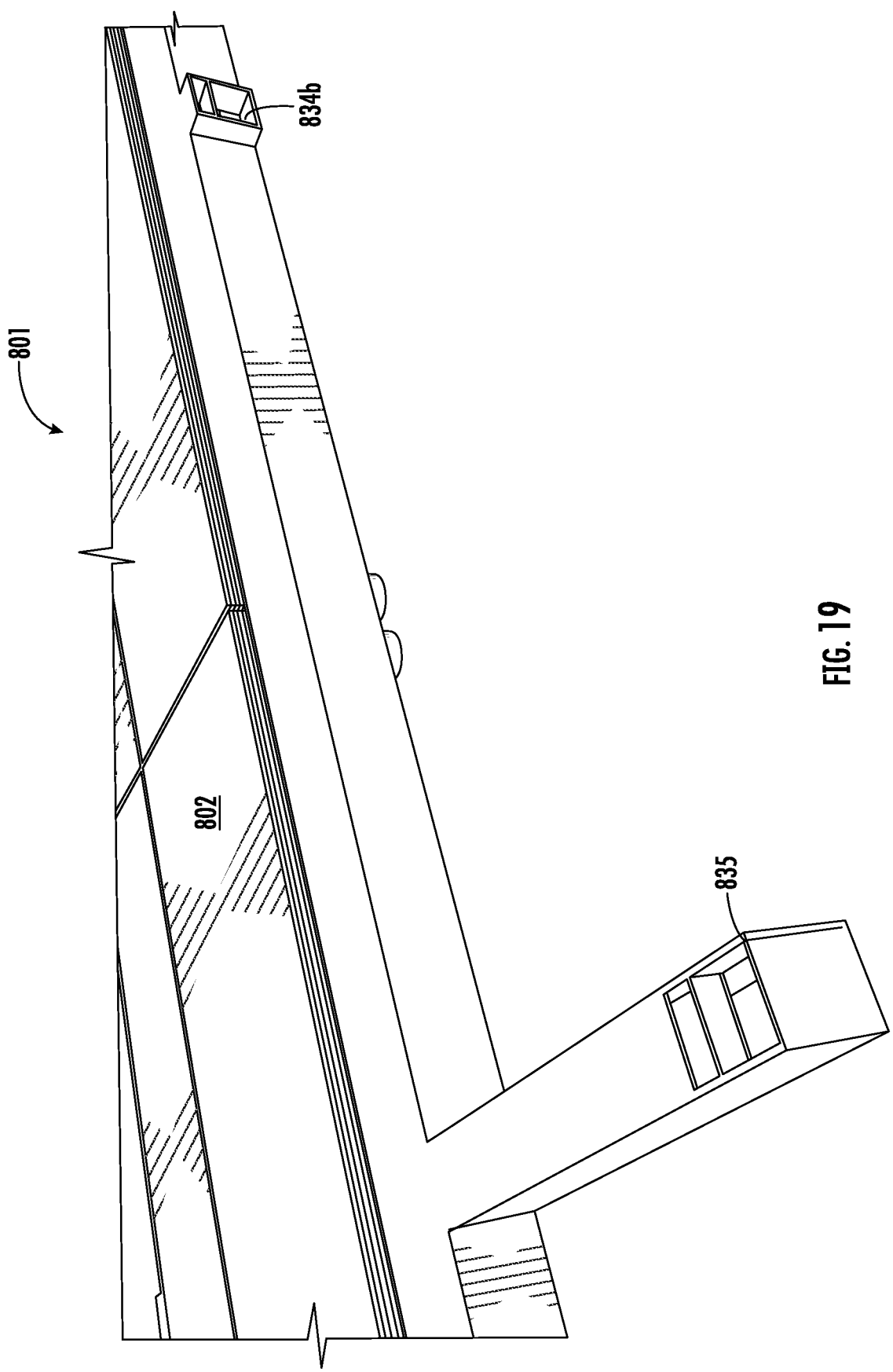
FIG. 19 is a perspective view of access ports from the subsurface energy storage system of FIG. 17 with lateral extensions.
Figure 20:
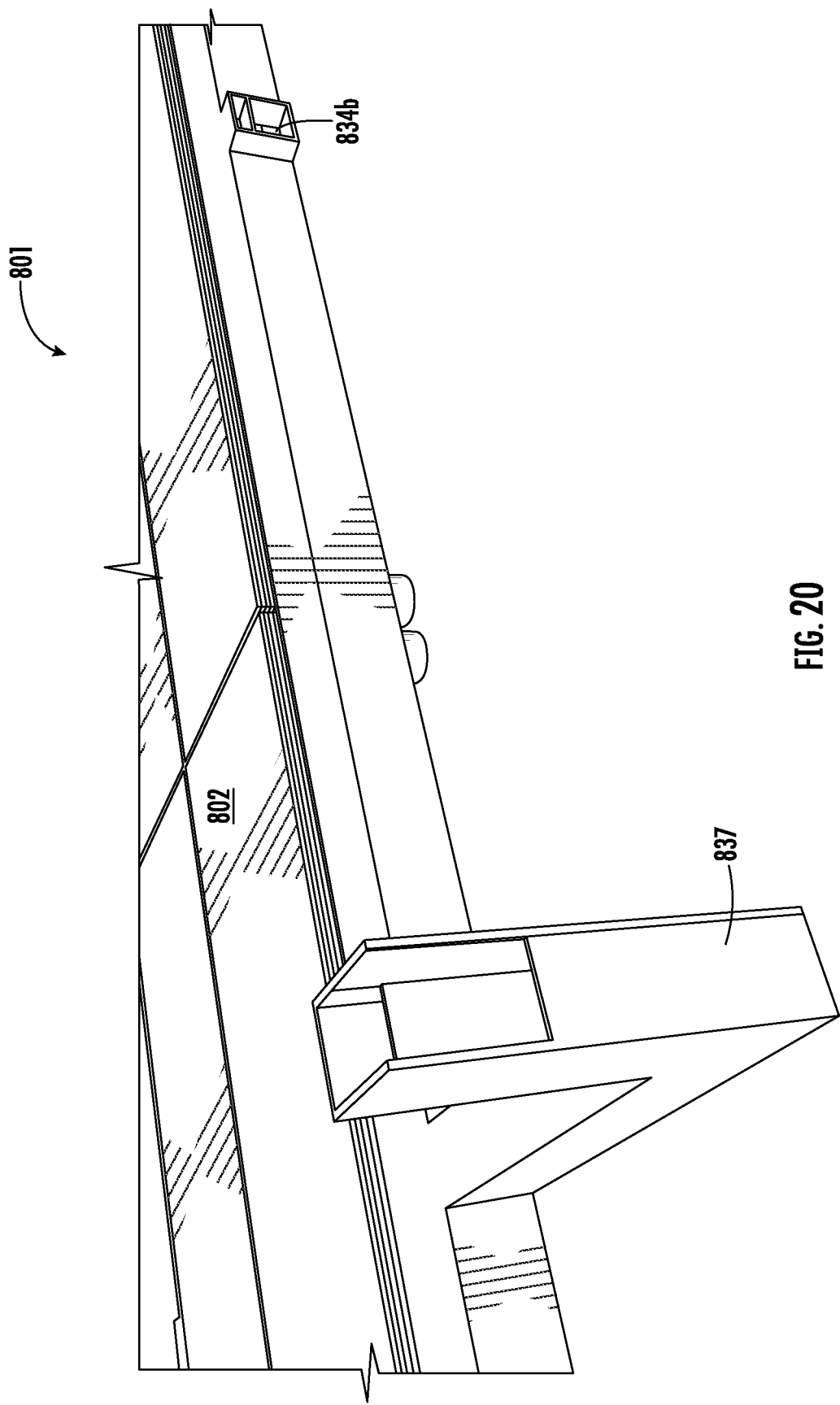
FIG. 20 is a perspective view of access ports from the subsurface energy storage system of FIG. 17 with vertical extensions.

As perhaps best seen in FIG. 18, each of the first and second distribution conduits 833a-833b illustratively comprises a plurality of access ports 834a-834b. In some applications, such as shown in FIG. 19, one of the first and second distribution conduits 833a-833b illustratively comprises a lateral extension 835 coupled to one of the plurality of access ports 834a-834b. In other applications, such as shown in FIG. 20, one of the first and second distribution conduits 833a-833b illustratively comprises a vertical extension 837 coupled to one of the plurality of access ports 834a-834b. It should be appreciated that the features of the roadway energy storage system 100, 200, 300, 400, 500 may be combined with the subsurface energy storage system 600, 700, 800, and vice versa.

Referring now additionally to FIG. 21, another embodiment of the subsurface energy storage system 900 is now described. In this embodiment of the subsurface energy storage system 900, those elements already discussed above with respect to FIGS. 6-15 are incremented by 300 and most require no further discussion herein. This embodiment differs from the previous embodiment in that this subsurface energy storage system 900 illustratively includes first and second additional energy storage assemblies 903b-903c adjacent the roadway housings 901a-901h.

Although the illustrated embodiment includes the energy storage assembly 903a within each of the roadway housings 901a-901h, this original energy storage assembly 903a from the above embodiments may be omitted in lieu of the side positioned first and second additional energy storage assemblies 903b-903c. In other words, the plurality of layers 624a-624d is adjacent, in particular, to the side of the first and second additional energy storage assemblies 903b-903c. This embodiment may be helpful for bridge/overpass roadways that perhaps aren't thick enough or structurally strong enough to absorb the extra weight of the energy storage assemblies 903a-903c in the subsurface energy storage system 600. Here, the original energy storage assembly 903a removed and replaced by the first and second additional energy storage assemblies 903b-903c shunted off the bridge to adjacent ground surface.

In the following, an example embodiment of the subsurface energy storage system 600 is now described.

As new technologies and vehicle options continue to develop in the transportation arena, there may be a desire and need to incorporate these into the existing asphaltic roadways. It will become increasingly difficult to open the roadways to accommodate all these technologies individually, which when done will leave the roadways "sliced" up and looking like Swiss cheese. To that extent, many municipalities and/or roadway agencies have mandated that anytime the roadways are opened for construction or work, all roadway/asphalt restoration will need to be performed "Curb to Curb" which will lead to increasing cost associated with any modification, enhancements, or alterations to/or beneath the existing roadway.

One of the advantages of the modular, multi-layered roadway approach is that after it is installed, it provides the necessary layers that will replace the old/existing asphaltic roadways and the means to adapt or adjust a single independent modularized layer without any incremental changes to the actual roadway, thereby eliminating the triggering of roadway regulations and costly opening/excavation and restoration.

This provides flexibility, adaptability, expandability, and modularity without needing extensive, expensive, and intrusive infrastructure changes without the need for asphalt repair or replacement. This provides the added benefits of the new technology to society and/or the transportation agency or municipality.

Energy Solutions

In some embodiments of the RESS, the roadway platform may capture renewable energy from solar panels placed on the roadway surface, pressure plate mechanisms to capture energy from the weight of the traveling vehicles, and various other forms of energy capture sources. The RESS may also store the captured energy "on board" in the available Energy Storage Units (ESUs). Not only is the creation and storage of energy important, but also the transmission of existing and future energy sources, which requires extensive infrastructure development and maintenance (i.e., wires for electricity, piping for hydrogen).

In an embodiment of the RESS, the RESS includes an energy transportation layer, which accommodates various energy transmission means. The interconnected roadway segments provide an isolated channel for containing the transmission mechanism (e.g., conduit, pipe, etc.). Another embodiment stores energy within the energy storage layer, and this can be utilized for overhead roadway lighting or advertising (e.g., powered billboards).

Surface Solutions

In addition to the shortage of drivers for delivery of goods and services, there are shortages of drivers to operate plows for snow removal in the colder states and regions. This shortage is a concern for all transportation agencies as their roadways become snow covered and need to have the snow removed and possible anti-skid agents (i.e., salt, sand, brine solutions, etc.) applied to provide a safe traveling surface for the moving traffic. Less plow operators lead to unsafe roads and potentially numerous accidents and fatalities.

In an embodiment of the RESS, the RESS includes surface layers, which contain precipitation and temperature sensors combined with heating elements specifically designed to turn on and operate when needed to melt the freezing precipitation off the roadways. This prevents the accumulation of snow or ice and provides a skid free surface even in snow storms to reduce or eliminate the need for snow plowing. This allows for transportation agencies to direct their human resources where there is a need in their communities. This combined effort of modular RESS and the local agencies can fill the gap of the shortage of drivers and provide a higher level of safety for the motoring public than currently exists.

Telematics Solutions

The transport of goods and services throughout the world require numerous vehicles and also people to drive those vehicles. To that extent, there is currently a shortage of people available to operate this growing fleet of vehicles. This shortage is causing issues in delivery of goods and services and driving up the costs of delivery based on the supply and demand caused be insufficient number of drivers. Auto manufacturers are moving in the direction of autonomous or self-driving vehicles for personal use but also for large scale trucking fleets to fill this large gap that is growing. While testing is going on, there is certainly a feeling of concern about the safety of a fleet of vehicles using the roadways with no one physically in the vehicles to operate them and intercede in case of an abnormal situation.

Many autonomous vehicles are utilizing satellite technology, which has limitations based on cloud cover, weather impact, or overhead obstructions that can interfere with communication to the vehicles. In addition to the evolution towards autonomous vehicles, the number of manually operated vehicles continues to escalate, causing further traffic congestion and roadway accidents.

In an embodiment of the RESS, the RESS includes a sensor layer that would be able to communicate with the autonomous and manual vehicles providing valuable data, which can be incorporated into a sophisticated traffic management system (TMS). The TMS would be able to help the autonomous vehicle or the operator to navigate the roadways by understanding the speed of vehicles ahead of them, adjusting speed based upon road conditions, and regulating traffic to allow the vehicles to flow more smoothly. Additionally, the sensor technology layer eliminates the issues created by overhead obstructions or weather-related impacts to the communication with the vehicles.

In an embodiment of the RESS, the RESS includes the sensor layer with sensors that provide the ability to monitor the overall roadway utilization and vehicle weights. This information can then in turn be used to allocate roadway usage and toll collection fees. This sensor information could also be used to estimate the relative timing as to when maintenance is required. Another embodiment of the sensor layer incorporates sensors that monitor a vehicles speed. This information can be used by authorities with respect to speed violations. Another embodiment of the sensor layer incorporates embedded LED or similar lights. Within each layer, these lights can be programmed to indicate valuable static traffic information such as road names, speed limits, etc. Combined with the TMS, these lights can additionally provide dynamic information based upon ever changing situations such as lane closures, detours, or general road hazards.

Another embodiment of the sensor layer is that it provides roadway information directly to the vehicle, which can be displayed upon the vehicles internal display, alerting the operator (i.e., lane closures, detours, etc.). In an embodiment of the RESS, the RESS includes the sensor layer providing specific location dependent information to the operator. For example, it is envisioned that based upon the vehicles location, local businesses within close proximity could pay to advertise their products and services to the passing vehicle, whereby the information would be displayed on the vehicles internal display. Another embodiment of the sensor layer is that it could provide specific channels to house an embedded wire guidance or the like, which automobiles could use for alignment purposes while traveling on the roadway, thereby eliminating the need for GPS and other means to monitor and regulate the path of the vehicle.

Referring initially to FIG. 14, a RESS comprises a foundational layer with footings/piles that will be designed and constructed to conform to the local variables encountered where existing roadways and proposed roadways are modified to accommodate the RESS to support the installation of the RESS. These variables can include soil conditions and geology, local water table, seismic activity, etc., that can affect the operation of the roadways. Designs will be performed to determine the necessary foundational layer thicknesses, footing depths and footings flexibility and vibrational performance, etc., to protect the fully installed and operational RESS.

In the construction of buildings, bridges, infrastructure, etc., the importance of the foundations and footings cannot be stressed enough. The entire weight and loading of the structure will rest on this base and needs to have the necessary construction as designed to survive for years and centuries. If designed correctly, there will never be a failure in this critical aspect of RESS which will support the overall loading of the innovation and the weight loading of the vehicular traffic moving along the surface for years to come.

The failure mechanisms of the various soil conditions need to be taken into consideration to compensate for the seismicity of the local zone. Soils that are liquefiable versus non-liquefiable have significant differences in how they handle various loads. These considerations will be taken into account during the design and construction of the footings/piles.

As with the existing roadways that vehicles operate on, the asphaltic layer that vehicles drive on is supported by multiple layers of stones of various coarseness with a finished concrete or asphalt layer. All these intermediary layers sit on a foundational base that rests on the substrate of the Earth. The foundational layer of the RESS will be placed on this same substrate as the current roadways and have further support of the piles/footings to enhance the stability of the foundational layer. Based on the stability of the substrate, the foundational layer will be designed to optimum thickness required to support the weight loading of the RESS innovation and the additional loading of the vehicular traffic moving along on the RESS Surface. The combination of the footings/piles and the foundational layer provide a form of redundancy and safety that will provide confidence in the longevity of the innovation once implemented into full operation.

Referring to FIG. 8, the RESS comprises a drainage storage reservoir to capture all forms of precipitation, rain, snow, sleet, etc. once it has been "melted" into a liquid phase. The drainage storage reservoir will rest on the foundational layer and be affixed to this foundational layer for system stability. The configuration of this drainage storage reservoir will be designed to incorporate structural supports throughout the reservoir to handle the weight loading of the surface of the roadway.

As these reservoirs fill to capacity, the liquid contents will be conveyed from one RESS unit to adjacent units in an effort to balance or equalize the levels in these reservoirs for liquid storage for future distribution to receiving waters, irrigation needs, or local water authority needs in low water or drought conditions. A primary benefit of the liquid storage capability of the RESS will be to minimize and/or eliminate localized flooding of the roadways causing a "hydroplaning" condition which could cause unsafe traveling conditions for the motorists using the roadways. The offloading of the contents of these drainage storage reservoirs can be controlled into localized receiving waters through a variety of piping, pumps and valves as local water levels are monitored to ensure that those receiving bodies of water are not over capacitated to flooding levels. Based on the network of RESSs, there could potentially be enough storage capacity to hold these captured liquids for a sustained period of time, discharging and offloading at a flow rate that allows for those waters to dissipate naturally into the local ground water table to prevent localized flooding Referring to FIGS. 9-10, the RESS comprises a base housing assembly and cabling channels, which will provide an "Open Tray" configuration to accommodate the RESS operational modules of varying designs. In addition, the base housing assembly and cabling channels will be the primary system for connection and communications with adjacent RESSs, internal connections to the RESS operational modules and the external power grid. The cabling channels will house data lines, AC cables and connectors, DC cables and connectors, isolation switches/circuit breakers, etc. that will be instrumental in linking the RESSs to multiple units and/or the local power grid.

The base housing assembly and cabling channels assembly will have a multitude of "Punch Outs" internally and externally that allow for interconnectivity to the operational modules of the RESS to connect or disconnect the operational module from the base housing assembly and cabling channel for installation purposes and/or for extraction and replacement of defective units or for general preventive maintenance of these operational modules. The "Punch Outs" also allow for individual RESS units to be connected to adjacent RESS units and multiple RESS units' system wide. These available "Punch Outs" also allow for the connection of the RESS to external power sources, such as the national grid system and/or renewable energy sources local to the RESS unit. These "Punch Outs" also allow for data transfer cabling such as fiber optics etc., to be "fed" into the cabling channel and the operational module of the RESS.

The base housing assembly and cabling channels will be directly positioned above the drainage storage reservoir and will be affixed to this unit to provide stability of the overall innovation. There will be sufficient gaskets and/or sealing systems in place to properly separate and protect the base housing assembly and cabling channels and the RESS operational units from coming into contact with moisture and/or water which could affect safe operation of the RESS.

Figure 9:
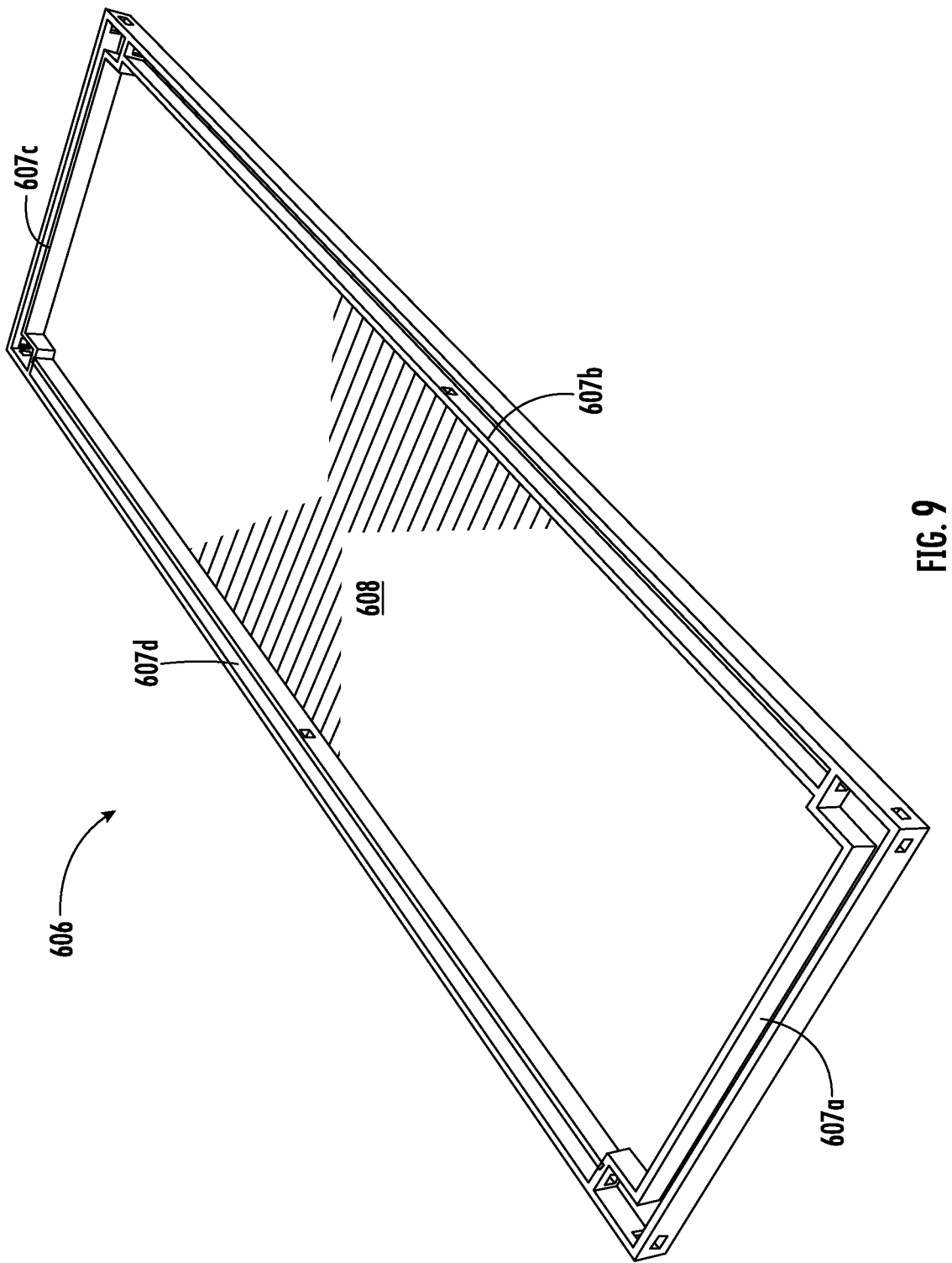
FIG. 9 is a perspective view of an outer housing from the subsurface energy storage system of FIG. 6.

Referring to FIGS. 8-10, an RESS according to the present invention comprises the operational module of the RESS. The operational module of the RESS will be constructed with a variety of cavities and/or compartments which will house a multitude of ESUs of varying construction. The compartments of the operational module of the RESS will have interconnecting channels or ducts to allow for cabling to connect a multitude of ESUs to be connected to each other and to the Energy Management System (EMS) on board.

The operational module will contain a cavity and/or compartment to house the multitude of control systems to monitor the components and sensor technology of the RESS. The operational module of the RESS will contain a cavity and/or compartments to house advanced EV charging technology, whether wireless, full contact with a "pick up" charging rail or other advanced charging methods for EVs that may be developed in the future.

The operational module of the RESS will contain interconnecting channels or ducts that will allow for numerous RESSs to be connected to form ESUs on the roadway. The number of RESS units that can be connected together and the size of the energy storage grids on the roadways will be dependent on the type of ESUs contained in the RESSs individually and the available storage capacity of the ESUs used.

A key consideration in the design of the RESS units is the realization that these systems will be designed to operate for a significant time period, but as with all electronic devices, will at some point need to be maintained whether in Place (In Situ) or "Off Site". The ability to maintain these units individually without the need to shut down or disable an entire roadway for miles or community so that the units can be addressed is critical. To that extent these RESS Units have been configured in such a way that the outer channeling in the base housing assembly and cabling channels is configured to house the power distribution network that the operational modules will connect to. To the main/national power grid or the internal DC energy grid, there will be isolation switches/circuit breakers that can be activated manually on board the unit or performed remotely via the use of Bluetooth or data transmission cabling to shut down and disable the operational module to render it "Shut Off" or completely de-energized to allow for the unit to be opened in place and repaired or to allow for the module to be "Unplugged" from the base housing assembly and cabling channel and removed in its entirety and a fully functional replacement module inserted and plugged in and the isolation switches/circuit breakers turned on and the replacement unit immediately communicate with the network and go through configuration steps to add this operational module to the network/system/grid. This process and unique ability of the RESS units will minimize the downtime of the roadway and inconvenience to the motoring public as units are "switched Out".

With the addition of newer sensor technology that is "Stand Alone" and not incorporated into the RESS surface layers, should maintenance be required, there would be a need to excavate and extract defective sensors or cabling from the roadway to repair/replace. As mentioned previously, these types of operations will prove very impractical in the future when the need for complete asphalt restoration "Curb to Curb" is required anytime you cut into the existing asphalt. This is a key fact that has been considered in the development and design of the RESS operational modules and their Plug and Play configuration.

Figure 13:
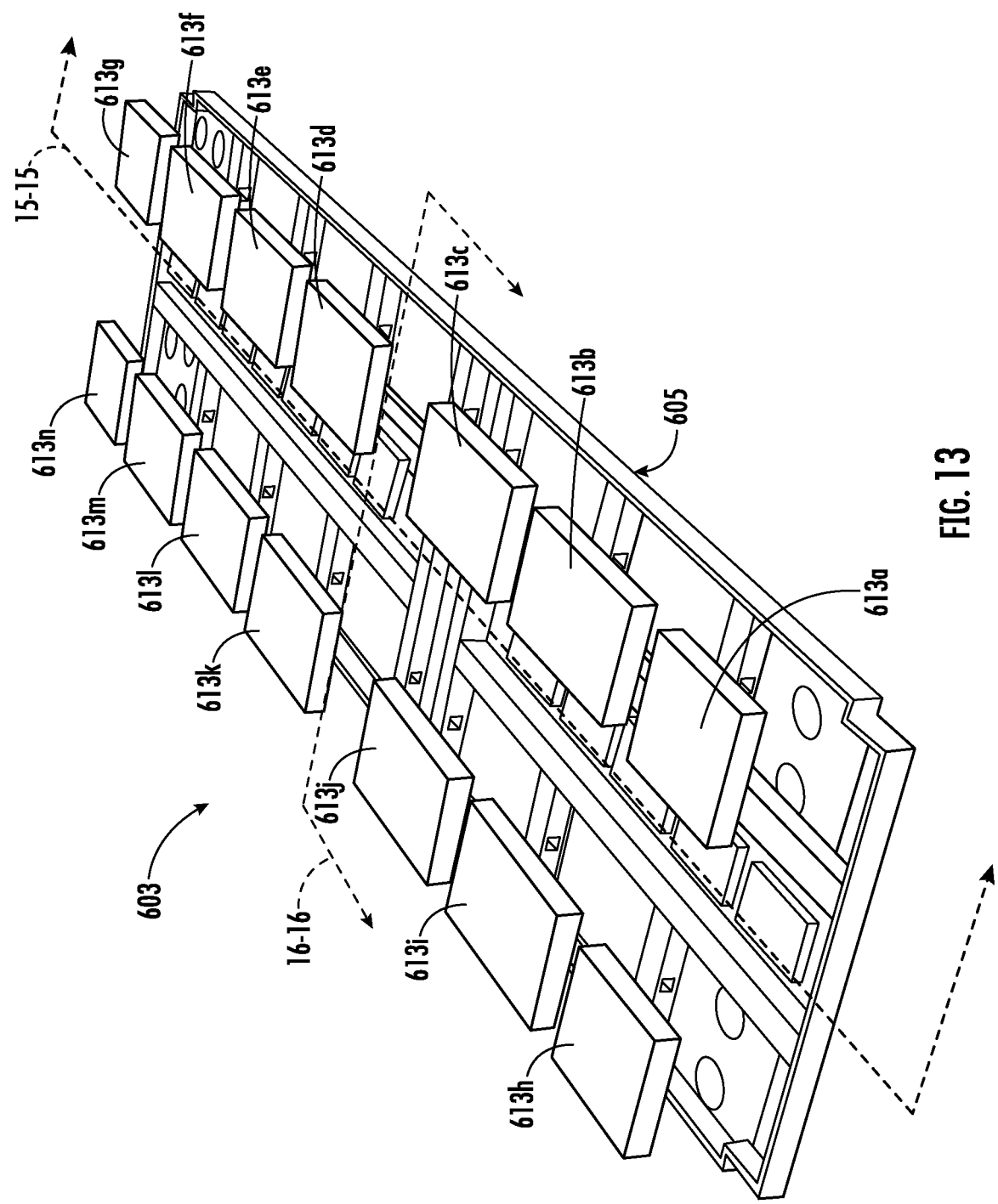
FIG. 13 is a perspective view of the inner housing and energy storage units from the subsurface energy storage system of FIG. 6.

Referring to FIG. 13, the RESS comprises the operational module of the RESS with a sample of ESUs that will be inserted into the available cavities and/or compartments. The operational module of the RESS will contain cushioning units that will support the operational module as it is placed and seated in the base housing assembly and cabling channels. These cushioning units will be designed to absorb much of the vibration caused by the traffic moving along the surface of the RESS to minimize or eliminate damage to the ESUs and the control systems contained in the operational module The RESS comprises the operational module of the RESS with the ESUs inserted into the cavities and/or compartments. Referring to FIGS. 7-8, the RESS may be modified as needed to accommodate any local conditions as the RESSs are being designed for implementation. The RESS depict several surface layers that will be incorporated into the RESS to provide additional features and benefits to the roadways and the traffic and motorists utilizing them.

Layers proposed to be incorporated under this innovation could incorporate innovative renewable energy technology such as roadway solar panels to capture solar energy from the sunshine contacting the roadway Surface. This captured energy can be transferred to the ESUs onboard the RESS and/or distributed to the power grid offsite if needed.

Layers proposed to be incorporated under this innovation could incorporate innovative renewable energy technology, such as pressure plates that capture energy from the weight of moving vehicles on the surface of the roadway. This captured energy can be transferred to the ESUs onboard the RESS and/or distributed to the power grid offsite if needed.

Layers proposed to be incorporated under this innovation can incorporate heating elements to maintain a surface temperature of the road surface above the freezing temperature levels to allow for all precipitation falling on the roadway to remain in a liquid phase to be transferred off the road surface and directed to the onboard drainage storage reservoir to offsite local receiving waters. Layers proposed to be incorporated under this innovation can incorporate a variety of current and future sensor technology to allow the smart roadways to interact with the motoring public to notify them of roadway delays, impending safety issues of obstructions on the roadway, etc.

The surface and/or top Layer of the RESS will comprise embedded lighting elements that can be utilized to create lines to delineate the lanes of traffic, restrictions on lane changing, impending lane closures for potential roadwork and/or roadway maintenance, etc. The roadway surface of the RESS will provide a surface that provides the necessary and required friction/traction as mandated by any and all local, state and federal transportation agencies and standardizing organizations to provide a surface that will hold the moving vehicles onto the roadway surface and provide for the required stopping distances when brakes are applied.

Referring to FIG. 5, the RESS comprises an alternative configuration of the RESS operational module that provides for more surface drainage ports or openings to allow for better off road drainage that will feed into the onboard drainage storage reservoir. The RESS comprises an alternative configuration of the RESS operational module that provides alternate configurations of cavities and/or compartments to house ESUs of differing sizes to allow for more or less ESU's to maximize the amount of energy storage allowable per RESS that can be designed and configured. The RESS comprises an alternative configuration of the RESS operational module that provides alternate cabling channels or ducts to interconnect the ESU's and connect them to the on-board control systems that will monitor, charge or discharge the ESU's, etc.

Referring to FIG. 3, the RESS shows the general configuration and layout of the onboard roadway solar panels on the roadway surface layer of the RESS. The RESS shows the incorporation of a variety of electric vehicle charging options, one using a wireless charging plate and a second option of incorporating a charging rail for direct contact of a charging "Pick-up" attached to the electric vehicles as they move along the surface of the RESS. The flexibility of the RESS will allow for future innovative electric vehicle charging options as they are created.

Referring to FIGS. 15-16, the RESS has alternate layouts that could be designed or configured based on local available conditions. In these views, should the existing substrate be compacted properly and potentially no seismic activity, the RESS may be able to be placed directly onto the existing roadway substrate and negate the need for the designed footings. These options will be based on site specific determinations when the variables of the location are compiled, and the designs calculated.

Referring to FIG. 7, the RESS is fully constructed and prepared for service. All necessary preparation will need to be made to mill or excavate any existing roadways to an elevation that once the RESS is installed the surfaces of the RESSs will meet the elevation of adjacent roadways and/or shoulders. In certain instances, the RESS can be simply laid on top of existing roadways and no milling and/or excavation will be required. Here the existing roadways will provide the necessary substrate to support the RESS. These decisions will be determined through the local variables and interactions will local transportation officials and agencies to comply with local, state or federal requirements.

Referring to FIG. 6, the RESS is constructed and prepared for service and installed with multiple systems to comprise an energy storage system grid. As multiple systems are connected together and based on the rigid nature of the systems, expansion joining and joints will need to be designed and installed between the RESS plates to provide for proper expansion and contraction of the road surface during changing seasons and temperature changes that affect soil conditions from a freeze/thaw cycle. The expansion joints will allow for slight movements of the systems without causing any undue deterioration of the system.

Referring to FIG. 4, the RESS is fully constructed and installed in a representative residential neighborhood as it would be positioned on those roadways to capture local grid energy, residential solar energy, onboard roadway solar energy, pressure plate energy captured from the weight of moving vehicles, etc. This RESS provides necessary energy storage to contain excess energy available in the proximity of the RESS.

Stored energy contained in the RESS can be available to the local power grid and neighborhood to feedback such stored energy to the local residences and the power grid in the event of a "Power Outage" to support the local grid and power authorities until such time as their infrastructure is repaired and back in full operation. At that time, the transfer of the energy from the RESS will cease to flow off the RESS to the Grid. During the period of time when the power is flowing from the ESUs onboard the RESS to the local power grid, the RESS will have the ability through electrical components, systems, hardware and software and load balancing systems to direct the energy flow from individual ESUs in a discharging mode feeding the local power grid and residences, while simultaneously recharging depleted and/or low ESUs with the various other forms of renewable energy sources, such as residential solar energy, onboard roadway solar energy, pressure plate energy captured from the weight of moving vehicles, etc. during this period of emergency support.

The stored energy contained in the RESS, and energy will be continuously flowing in and out of the energy storage system in the form of charging and discharging as energy is needed for continuous operation of onboard systems, and non-contact or contact charging of electric vehicles through the use of electrical components, systems, hardware and software during normal daily operation independent of emergency situations.

The RESS includes electrical components, systems, hardware and software that will be connected in a design that allows for the overall system operation which primarily achieves charging/discharging of the ESUs, balancing the charge of all the ESUs across the entire micro or macro grid to ensure all the ESUs are generally at a full charge level as much as is practical as energy if utilized to charge EVs traveling along the surface of the RESS and energy is utilized to operate the onboard heating elements to keep the roadway free of any frozen precipitation when the temperature falls below freezing, energy to operate any embedded sensor technology that will be utilized to capture data, share data and utilize the captured data to control hardware/ Software that will carry out instructions and/or notifications to onboard, adjacent and/or offsite control systems that take corrective action based on the information obtained and the results of the comparative software algorithms chosen instructions for action.

Referring to FIG. 8, the RESS comprises a drainage storage reservoir to capture all forms of precipitation, rain, snow, sleet, etc. once it has been "melted" into a liquid phase. As discussed in hereinabove, and as a further discussion, the captured and stored precipitation can be utilized to support the EMS if the need arises to provide a cooling medium for any ESUs should the observed and sensed temperature of the ESU exceed proper operating temperatures. Pumping and/or recirculation systems can be incorporated to draw this collected precipitation and distribute it to the cavity/compartment to cool the ESU.

Roadway surface layers proposed to be incorporated under this innovation can incorporate heating elements to maintain a surface temperature of the road surface above the freezing temperature levels to allow for all precipitation falling on the roadway to remain in a liquid phase to be transferred off the road surface and directed to the onboard drainage storage reservoir to offsite local receiving waters as detailed hereinabove. Based on the critical safety feature that the heating element will comprise to the RESS system, there will a redundant layer or multiple heating element layers in this particular surface plate so that if for any reason one heating element layer malfunctions or fails to turn on or does not heat to the desired temperature, the secondary/redundant heating element layer will activate to replace the original or primary heating element layer. Alarm notifications will be dispatched by the RESS via Supervisory Control and Data Acquisition (SCADA) systems to a control room where repair/maintenance crews can be scheduled and dispatched to the defective RESS to rectify the situation and remove the heating element layer in its entirety and replace it with a fully functional unit while taking the defective unit offsite for remediation and repair. Highway authorities will be reliant on this beneficial feature of the RESS and as such, redundancy is a requirement to protect the motoring public.

Based on the criticality of some of the features incorporated into the RESS smart roadways, if based on the onboard ESU's Management System, there is any indication that the RESS is in imminent or potential catastrophic condition that could cause a clear and present threat to the motoring public, i.e. ESUs overheating and not being able to be cooled into a safe operating temperature and the potential is present of these ESUs combusting and catching fire, the SCADA systems will sound alarms and take immediate corrective action such as "Shutting Down" or "Disabling/Deenergizing" the RESS operational module to prevent any further malfunction and/or overheating and potential fire breaking out. When this event occurs, while the operational module is inactive, the roadway surface layers housing the heating elements will remain fully functional and while the energy sources on the same RESS have been disabled, the SCADA system will "notify" adjacent RESS units and switches will be remotely operated to shut off the onboard energy flow and open switches to power the heating elements from those adjacent RESSs keep the entire surface above freezing even if there are deactivated operational modules below. This will allow the emergency response technicians sufficient time to extract and replace the defective operational module while maintaining a safe traveling surface during the process.

This same beneficial feature can be applied to the electric vehicle charging systems to prevent any of these systems to be without a power source at any time. The intelligence of the SCADA systems will be instrumental in observing and adjusting to the needs of every aspect of the RESS system, individually, collectively and globally.

Although the RESS primarily will be utilized on the traveling roadways that carry vehicles and cargo, this embodiment of design is also assumed to be utilized in all areas/jurisdictions or easements of the roadway authorities ownership, such as roadway shoulders, medians between roadways, entrance/exit ramps, etc. where based on the modular system design, unique and individual components of the RESS may be customized to be made to accommodate the features of the roadway shoulders, medians between roadways, entrance/exit ramps, etc. to meet and conform to their individual substrate geology as well as surface loadings as determined through proper engineering design.

The RESS is a completely modular design that can be combined with all the individual components as a fully designed unit or can be "broken" up to utilize individual components independently and separate from the other components. Locations where the existing substrate of the roadway has sufficient support that there is no need to further support the RESS with a foundational layer and/or the footings/pilings. In these instances, this layer of the RESS may be removed from the embodiment of the design and all other layers can be used in its absence.

In areas where the roadway extends and crosses over bridges or other roadway structures where the surface layer of the existing roadway does not have sufficient depth of cover to accommodate the RESS in its entirety based on the need to match up or "marry" up with the existing roadway elevations, there may be a desire to "bridge" or "span" this roadway area with only the RESS Surface Layers. This will be critical on bridge crossings where we will need to maintain the surface temperature high enough in freezing and/or below freezing temperatures to keep the roadways snow and ice free since the local highway authorities will be relying on the RESS to be maintenance free and not requiring plowing operations. These separate and independently deployed surface plate will be connected on either end to the nearest combined RESS to properly energize them to perform their intended purposes. These same surface layers may be able to incorporate the solar roadway panels if sufficient depth of cover allows for this increase height from the substrate.

On roadway shoulders, medians between roadways, entrance/exit ramps, etc., there may not be a need for the heating element layer, foundational Layer with footings and/or pilings, or pressure plate layer, and again based on the modular design of the RESS, the specific components of this embodiment can be mixed and matched to accommodate the needs and requirements of the application being addressed.

The RESS is a completely modular design that can be combined with all the individual components as a fully designed unit or can be "broken" up to utilize individual components independently and separate from the other components. In one embodiment of the RESS design and potentially on "Off Road" locations such as roadway shoulders, medians between roadways, entrance/exit Ramps, etc., it may be desired to increase energy and or and there is an Available footprint to allow for "stacking" of the RESS base housing assembly and cabling channels, RESS operational modules and surface layers, one on top of the other as the footprint allows to maximize the energy that particular application The RESS is a completely modular design that can be customized to conform to any and all geometrical layouts as may be necessary to conform to the angles, bends, transitions from multi lane to single lanes, width of lanes, etc. to follow the existing layout of the roadway infrastructure that will be replaced with the RESS Units. For example, instead of the rectangular model presented, an alternate geometrical shape such as a triangular, circular, rhombus, etc. can be created in an effort to conform and to be configured to match any existing roadway shape, size and design. It is understood that the number and/or quantities of the ESUs, EV charging plates, sensors, etc., are arbitrary and will be determined at the time of design to accommodate the specific layout and geometry selected to fill the roadway space available. It is understood that the physical size and dimensions of the roadway ESU is arbitrary and will be determined at the time of design to accommodate the specific layout & Geometry selected to fill the roadway Space Available.

With the advent of cars as a medium of transportation for society and the utilization of fossil fuels for energizing and powering these vehicles, roadways were created to make traveling smoother and more convenient. Over time, these roadways were deteriorating and needed maintenance to keep them in a usable state for vehicles to travel on. The cost of this maintenance was obviously something that should be covered by the people using the roadways the most. To this extent, it was determined that a tax would be included in the purchase of fossil fuels, i.e., gasoline, diesel, etc., that when collected would be used for roadway maintenance. Obviously, those using the roadways most purchased more fuel and thereby paid more in fuel tax to cover their increased use and share in the maintenance of the roadways. In recent years and with the advent of electric vehicles, this fuel tax-based revenue system for maintaining our roadways was going to be a diminishing monetary value that at some point in time would not be able to cover future needs of our roadways. As communities and transportation agencies grapple with this concern and issue, a new paradigm has emerged in the form of roadway usage charging (RUC) where vehicles will now be charged by the amount of roadway they travel on. Much of this will be monitored by a variety of sensor technology. In understanding this need, it is understood that with the beneficial use of the surface layers of the RESS that will contain a variety of energy capture sources, heating elements and sensor technology to aide in the generation of energy, maintenance of the roadway surface and communications with motorist and safety/navigational applications and software, the incorporation of additional sensors to track roadway usage to gather the necessary revenue for roadway maintenance can be included.

The RESS smart roadways will individually house multiple ESUs that will need to be individually monitored. Based on the range of available energy storage devices available in the market today and the nature of their construction and chemistries, each will possess its own unique requirements of metrics to be monitored to extend the useful life of these units. The control systems in place will understand the capacity of the ESUs, the nominal energy (i.e., energy that can be generated/provided from full charge to complete discharge of the ESUs), the power delivery of the ESUs, the specific energy or the amount of energy the ESU can store relative to its mass, the C Rate or the Time by which charging and discharging times are scaled, the cycle of the ESU—charge/discharge/charge rate, cycle life or the number of cycles an ESU can deliver in its anticipated life, the depth of discharge of the ESU assuming 100% to be full discharge, the state of charge indicating the charge level of the ESU at any specific moment in time, and the Coulombic efficiency which describes the charge efficiency with which electrons are transferred in the ESU, etc. All these metrics and more will be monitored continuously on each individual ESU cell by the ESU management system and communicated to the onboard SCADA system to work in tandem with the load balancing system locally and individually to provide the flow of energy from adjacent ESUs that have sufficient charge and/or excess energy to be shared with the onboard ESUs. Only once the entire onboard ESU cells are completely charged will any excess energy be distributed to the internal DC grid to be shared with adjacent RESS units locally or globally, so that the overall goal will be a fully charged RESS grid.

In an embodiment of the present disclosure, there will be onboard wireless and direct contact charging features to support the electric vehicles traveling over the RESS smart roadways. To this extent, these charging mechanisms will draw directly from the onboard ESUs to supply the needed energy to charge and support the electric vehicles and their batteries while they are driving to eliminate or minimize the need for exiting the roadway and finding off road charging options. This beneficial feature of the RESS smart roadways, when fully implemented, will allow for electric vehicles to not be restricted by vehicle battery capacity and distance Range assumed with a fully charged battery since the roadways and the RESS can keep these batteries and electric vehicles charged nonstop during their trip, whatever the distance, tens, hundreds and thousands of miles. The hesitation of EV ownership and the concern for the lack of infrastructure to support those vehicles will diminish with the RESS smart roadways to supply the EV with a never-ending supply of energy while on the roadways and traveling. The EV owners will be charged a comparable and accepted fee for the charging of their vehicles while operating on the RESS smart roadway system. It will be assumed that if the EV is fully charged and/or the EV Owner does not wish to charge his EV while using the roadway, this feature can be disabled by the EV owner simply by a switch in the EV.

As the Vehicles are traveling on the roadways, vehicle usages will be monitored and shared with local, state, and federal agencies if desired and requested to assess any usage fees/taxes for upkeep and maintenance of the RESSs. Smart roadways through the interaction of sensor technology, transponders, RFID codes, etc. At each level of this technology, there will be an overall SCADA system that will capture all the collected data from each lower level in the hierarchy and use/process this data to support the overall RESS grid up and down the chain. Ideally based on the interconnectivity of this system and once fully implemented potentially nationwide, energy can flow street to street, neighborhood to neighborhood, county to county, state and to state and across this country to ensure that all areas are served and the overall dependence on Fossil Fuels is Gone.

On that day, if there is a catastrophic storm in New York and the power grid is knocked out and communities are without heat, electricity, energy, communications, etc., the stored-up resources and underground network of services in the RESSs will have sufficient reserves in outlying states such as Connecticut and New Jersey that their energy and resources can be tapped into and transferred through the roadways to the depleted ESUs in New York and as the energy is depleting in their system. The energy available in New Jersey and Connecticut from the operational power grid and the renewable energy sources will begin recharging the depleted ESUs in Connecticut and New Jersey and the system continues to support the region and country as a whole. Roadways as a whole link this entire country and the world together as the roadways cross State lines everywhere. They connect us all, and the advent of the RESS and the overarching goal is to allow these very same roadways to provide more than a traveling surface but the means to support our communities and country through the newly created infrastructure they now contain.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A subsurface energy storage system comprising:
a plurality of roadway housings arranged to define a surface to carry vehicles, each roadway housing comprising
an energy storage assembly comprising
a housing defining a plurality of cavities therein, and a plurality of channels surrounding the plurality of cavities and extending between the plurality of cavities, and
a plurality of energy storage units respectively carried within the plurality of cavities and being electrically coupled together, and
at least one layer directly over the energy storage assembly and to provide the surface to carry vehicles, the at least one layer comprising an over layer defining the surface to carry vehicles; and
an energy storage management controller coupled to the plurality of energy storage units in the plurality of roadway housings and configured to perform at least one energy management function for the plurality of energy storage units.

2. The subsurface energy storage system of claim 1 wherein the housing defines a plurality of passageway ports between the plurality of channels.

3. The subsurface energy storage system of claim 1 wherein each roadway housing further comprises a drainage channel under the energy storage assembly.

4. The subsurface energy storage system of claim 3 wherein each roadway housing further comprises a support assembly under the drainage channel.

5. The subsurface energy storage system of claim 4 wherein the support assembly comprises a support layer abutting the drainage channel, and a plurality of vertical legs extending from the support layer.

6. The subsurface energy storage system of claim 1 wherein the at least one layer comprises a transducer layer configured to generate energy from traffic on the surface to carry vehicles, and being coupled to the energy storage management controller.

7. The subsurface energy storage system of claim 1 wherein each roadway housing further comprises a distribution conduit coupled to the energy storage assembly.

8. The subsurface energy storage system of claim 1 wherein the housing defines at least one longitudinal cavity; and wherein the energy storage assembly comprises at least one charging device within the at least one longitudinal cavity.

9. The subsurface energy storage system of claim 1 further comprising at least one visual indicator carried by the over layer for the surface to carry vehicles.

10. The subsurface energy storage system of claim 1 wherein the at least one layer comprises a heating element layer for deicing the surface to carry vehicles.

11. The subsurface energy storage system of claim 1 wherein each of the plurality of energy storage units comprises one of a battery and a capacitor.

12. A roadway housing device for a subsurface energy storage system arranged to define a surface to carry vehicles, the roadway housing device comprising:
an energy storage assembly comprising
a housing defining a plurality of cavities therein, and a plurality of channels surrounding the plurality of cavities and extending between the plurality of cavities, and
a plurality of energy storage units respectively carried within the plurality of cavities and being electrically coupled together;
at least one layer directly over the energy storage assembly and to provide the surface to carry vehicles, the at least one layer comprising an over layer defining the surface to carry vehicles; and
an energy storage management controller coupled to the energy storage assembly and configured to perform at least one energy management function for the plurality of energy storage units.

13. The roadway housing device of claim 12 wherein the housing defines a plurality of passageway ports between the plurality of channels.

14. The roadway housing device of claim 12 further comprising a drainage channel under the energy storage assembly.

15. The roadway housing device of claim 14 further comprising a support assembly under the drainage channel.

16. The roadway housing device of claim 15 wherein the support assembly comprises a support layer abutting the drainage channel, and a plurality of vertical legs extending from the support layer.

17. The roadway housing device of claim 12 wherein the at least one layer comprises a transducer layer configured to generate energy from traffic on the surface to carry vehicles, and being coupled to the energy storage management controller.

18. A method for making a subsurface energy storage system, the method comprising:
positioning a plurality of roadway housings to define a surface to carry vehicles, each roadway housing comprising
an energy storage assembly comprising
a housing defining a plurality of cavities therein, and a plurality of channels surrounding the plurality of cavities and extending between the plurality of cavities, and
a plurality of energy storage units respectively carried within the plurality of cavities and being electrically coupled together, and
at least one layer directly over the energy storage assembly and to provide the surface to carry vehicles, the at least one layer comprising an over layer defining the surface to carry vehicles; and
coupling an energy storage management controller to the plurality of energy storage units in the plurality of roadway housings, the energy storage management controller to perform at least one energy management function for the plurality of energy storage units.

19. The method of claim 18 wherein each roadway housing further comprises a drainage channel under the energy storage assembly.

20. The method of claim 19 wherein each roadway housing further comprises a support assembly under the drainage channel; and wherein the support assembly comprises a support layer abutting the drainage channel, and a plurality of vertical legs extending from the support layer.

* * * * *

UNITED STATES PATENT AND TRADEMARK OFFICE
CERTIFICATE OF CORRECTION

| | |
|---|---|
| PATENT NO. | : 11,920,309 B2 |
| APPLICATION NO. | : 18/334447 |
| DATED | : March 5, 2024 |
| INVENTOR(S) | : Lounsbery et al. |

It is certified that error appears in the above-identified patent and that said Letters Patent is hereby corrected as shown below:

On the Title Page

Item (12)  Delete: "Botts et al."
Insert: -- Lounsbery et al. --

Item (71)  Delete: "Jerold L. Botts, Orlando, FL(US);
James Lounsbery, Middletown, NY (US)"
Insert: -- James Lounsbery, Middletown, NY (US);
Jerold L. Botts, Orlando, FL(US) --

Item (72)  Delete: "Jerold L. Botts, Orlando, FL(US);
James Lounsbery, Middletown, NY (US)"
Insert: -- James Lounsbery, Middletown, NY (US);
Jerold L. Botts, Orlando, FL(US) --

Signed and Sealed this
Thirtieth Day of April, 2024

Katherine Kelly Vidal
*Director of the United States Patent and Trademark Office*